(12) United States Patent
Tsuchida et al.

(10) Patent No.: US 11,895,240 B2
(45) Date of Patent: Feb. 6, 2024

(54) SYSTEM, APPARATUS, METHOD AND PROGRAM FOR PREVENTING ILLEGAL DISTRIBUTION OF AN ACCESS TOKEN

(71) Applicant: NEC Corporation, Tokyo (JP)

(72) Inventors: Hikaru Tsuchida, Tokyo (JP); Kengo Mori, Tokyo (JP); Toshiyuki Isshiki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 228 days.

(21) Appl. No.: 16/468,336

(22) PCT Filed: Dec. 15, 2016

(86) PCT No.: PCT/JP2016/087381
§ 371 (c)(1),
(2) Date: Jun. 11, 2019

(87) PCT Pub. No.: WO2018/109897
PCT Pub. Date: Jun. 21, 2018

(65) Prior Publication Data
US 2020/0177389 A1      Jun. 4, 2020

(51) Int. Cl.
*H04L 9/32*          (2006.01)
*H04L 9/08*          (2006.01)
(Continued)

(52) U.S. Cl.
CPC .......... *H04L 9/3234* (2013.01); *H04L 9/0861* (2013.01); *H04L 9/3247* (2013.01);
(Continued)

(58) Field of Classification Search
CPC ... H04L 9/3234; H04L 9/3247; H04L 9/3213; H04L 9/3242; H04L 9/3271; H04L 9/32;
(Continued)

(56) References Cited

U.S. PATENT DOCUMENTS

| 4,405,829 A | 9/1983 | Rivest et al. |
| 5,491,752 A * | 2/1996 | Kaufman ............... H04L 9/3226 380/30 |

(Continued)

FOREIGN PATENT DOCUMENTS

| CN | 101589400 A * | 11/2009 | ........... G06F 21/606 |
| CN | 101610273 A * | 12/2009 | ............ G06F 21/33 |

(Continued)

OTHER PUBLICATIONS

Japanese Office Action for JP Application No. 2018-556117 dated Oct. 10, 2019 with English Translation.
(Continued)

*Primary Examiner* — Eleni A Shiferaw
*Assistant Examiner* — Ali H. Cheema
(74) *Attorney, Agent, or Firm* — Sughrue Mion, PLLC

(57) ABSTRACT

In IaaS (Infrastructure as a Service), when it is desirable to delegate the authority to a user outside a system, a recipient of an access token is designated, thereby preventing illegal distribution of the access token. There is provided an access token system including a generator and a verifier. The generator generates, using secret information of a recipient, a recipient-designated access token for which the recipient is designated, and provides the recipient-designated access token to a user. The verifier verifies that the user who makes access using the recipient-designated access token is the designated recipient.

15 Claims, 26 Drawing Sheets

(51) Int. Cl.
*H04L 67/1017* (2022.01)
*G06F 21/33* (2013.01)

(52) U.S. Cl.
CPC .......... *H04L 67/1017* (2013.01); *G06F 21/33* (2013.01); *H04L 9/3213* (2013.01); *H04L 9/3242* (2013.01); *H04L 9/3271* (2013.01)

(58) Field of Classification Search
CPC ... H04L 9/0861; H04L 9/0833; H04L 9/0891; H04L 9/08; H04L 9/14; H04L 63/08; H04L 63/0807; H04L 63/105; H04L 63/168; H04L 63/02; H04L 63/0435; H04L 63/0442; H04L 63/061; H04L 63/123; H04L 67/1017; G06F 21/33; G06F 16/958
USPC .......................... 713/185, 176, 155; 726/1, 4
See application file for complete search history.

(56) References Cited

U.S. PATENT DOCUMENTS

| | | | | |
|---|---|---|---|---|
| 6,067,621 | A * | 5/2000 | Yu | H04L 63/0838 713/168 |
| 7,861,082 | B2 * | 12/2010 | Pinder | H04N 21/42684 713/168 |
| 8,056,131 | B2 * | 11/2011 | Radatti | G06F 21/56 713/168 |
| 8,224,754 | B2 * | 7/2012 | Pastusiak | G06Q 30/0207 705/14.1 |
| 8,412,928 | B1 * | 4/2013 | Bowness | H04L 63/0838 713/155 |
| 9,313,024 | B1 * | 4/2016 | Stute | H04W 12/069 |
| 10,325,085 | B1 * | 6/2019 | Mortensen | G06F 21/40 |
| 2004/0122877 | A1 * | 6/2004 | Nakayama | H04L 63/12 708/200 |
| 2005/0033703 | A1 * | 2/2005 | Holdsworth | H04L 9/3213 705/67 |
| 2006/0285682 | A1 * | 12/2006 | Sarangarajan | G09C 1/00 380/28 |
| 2008/0016347 | A1 * | 1/2008 | Maj | G06F 21/34 713/168 |
| 2008/0112313 | A1 * | 5/2008 | Terakawa | G06F 9/5011 370/229 |
| 2009/0119754 | A1 * | 5/2009 | Schubert | H04W 12/062 726/4 |
| 2009/0199009 | A1 | 8/2009 | Chia et al. | |
| 2009/0222662 | A1 | 9/2009 | Hataoka et al. | |
| 2009/0259658 | A1 * | 10/2009 | Hwang | G06F 16/168 |
| 2010/0275028 | A1 * | 10/2010 | Takashima | H04L 9/3247 714/E11.002 |
| 2011/0289571 | A1 * | 11/2011 | Yasuhara | G06F 21/31 726/7 |
| 2011/0313901 | A1 | 12/2011 | Kletzer | |
| 2013/0145173 | A1 * | 6/2013 | Shablygin | G06F 21/34 713/185 |
| 2013/0318351 | A1 * | 11/2013 | Hirano | H04L 9/3073 713/168 |
| 2014/0150055 | A1 | 5/2014 | Shimono | |
| 2014/0244788 | A1 * | 8/2014 | Resch | H04L 67/1097 709/217 |
| 2014/0331060 | A1 | 11/2014 | Hayton | |
| 2015/0281116 | A1 * | 10/2015 | Ko | H04L 9/3271 709/227 |
| 2015/0288703 | A1 * | 10/2015 | Yoshino | G06F 21/64 726/4 |
| 2016/0127330 | A1 | 5/2016 | Roth et al. | |
| 2016/0127365 | A1 * | 5/2016 | Bares | H04L 9/3278 726/1 |
| 2016/0165036 | A1 * | 6/2016 | Leow | H04B 1/385 455/557 |
| 2017/0017957 | A1 * | 1/2017 | Radu | G06Q 20/4012 |
| 2017/0060693 | A1 * | 3/2017 | Tadano | G06F 11/30 |
| 2018/0063105 | A1 * | 3/2018 | Poon | H04L 63/123 |
| 2018/0157703 | A1 * | 6/2018 | Wang | G06F 16/2453 |
| 2018/0248689 | A1 * | 8/2018 | Hu | H04L 9/0863 |
| 2021/0194694 | A1 * | 6/2021 | Sato | H04L 9/0819 |

FOREIGN PATENT DOCUMENTS

| | | | | |
|---|---|---|---|---|
| FR | 3027177 | A1 * | 4/2016 | .............. H04L 9/32 |
| JP | 10-222567 | A | 8/1998 | |
| JP | H1155244 | A * | 2/1999 | .............. H04L 9/08 |
| JP | 2004-213265 | A | 7/2004 | |
| JP | 2004274429 | A * | 9/2004 | ......... H04L 12/2821 |
| JP | 2005038411 | A * | 2/2005 | ......... H04L 63/0428 |
| JP | 2005-301577 | A | 10/2005 | |
| JP | 2006099724 | A * | 4/2006 | |
| JP | 2009-212731 | A | 9/2009 | |
| JP | 2011205452 | A * | 10/2011 | |
| JP | 2012-519889 | A | 8/2012 | |
| JP | 2013196478 | A * | 9/2013 | |
| JP | 2014-106652 | A | 6/2014 | |
| JP | 2015-8018 | A | 1/2015 | |
| JP | 2016-24475 | A | 2/2016 | |
| JP | 2016-526201 | A | 9/2016 | |
| KR | 100274389 | B1 * | 12/2000 | ........... H04L 9/3236 |
| KR | 100722363 | B1 * | 5/2007 | |
| KR | 101496347 | B1 * | 2/2015 | ......... G06F 21/6218 |

OTHER PUBLICATIONS

"Create a URL Signature Using PHP", Amazon CloudFront, Amazon Web Services, Inc. Retrieved Jun. 20, 2019, http://docs.aws.amazon.com/AmazonCloudFront/latest/DeveloperGuide/CreateURL_PHP.html, 2 pages total.

"Creating Signed URLs with a Program Cloud Storage Documentation Google Cloud Platform", Google Cloud Platform, Retrieved Jun. 20, 2019, https://cloud.google.com/storage/docs/access-control/create-signed-urls-program, 3 pages total.

"Use of Shared Access Signatures (SAS)", Microsoft Azure, Retrieved Jun. 20, 2019, https://azure.microsoft.com/ja-jp/documentation/articles/storage-dotnet-shared-access-signature-part-1/, 11 pages total.

Mihir Bellare et al., "Keying Hash Functions for Message Authentication", Annual International Cryptology Conference, Crypto 96 Proceedings, Lecture Notes in Computer Science vol. 1109, N. Koblitz, Springer Berlin Heidelberg, Jun. 1996, 19 pages total.

T. Bray, "The JavaScript Object Notation (JSON) Data Interchange Format", Internet Engineering Task Force (IETF), RFC 7159, Mar. 2014, 16 pages total.

T. Berners-Lee et al., "Uniform Resource Identifier (URI): Generic Syntax", Network Working Group, RFC 3986, Jan. 2005, 61 pages total.

A. Barth, "HTTP State Management Mechanism", Internet Engineering Task Force (IETF), RFC 6265, Apr. 2011, 37 pages total.

Takuya Kaneko et al., "Computer-aided User Authentication", Transactions of Information Processing Society of Japan, Sep. 15, 2014, vol. 55, No. 9, pp. 2072-2080, 10 pages total.

"Pre-Signed URLs—zaqar-specs 0.0.1.dev121 documentation", OpenStack Open Source Cloud Computing Software, Retrieved Jun. 20, 2019, https://specs.openstack.org/openstack/zaqar-specs/specs/liberty/pre-signed-url.html#pre-signed-url, 4 pages total.

International Search Report dated Feb. 7, 2017 issued by the International Searching Authority in International Application No. PCT/JP2016/087381.

Written Opinion dated Feb. 7, 2017 issued by the International Searching Authority in International Application No. PCT/JP2016/087381.

* cited by examiner

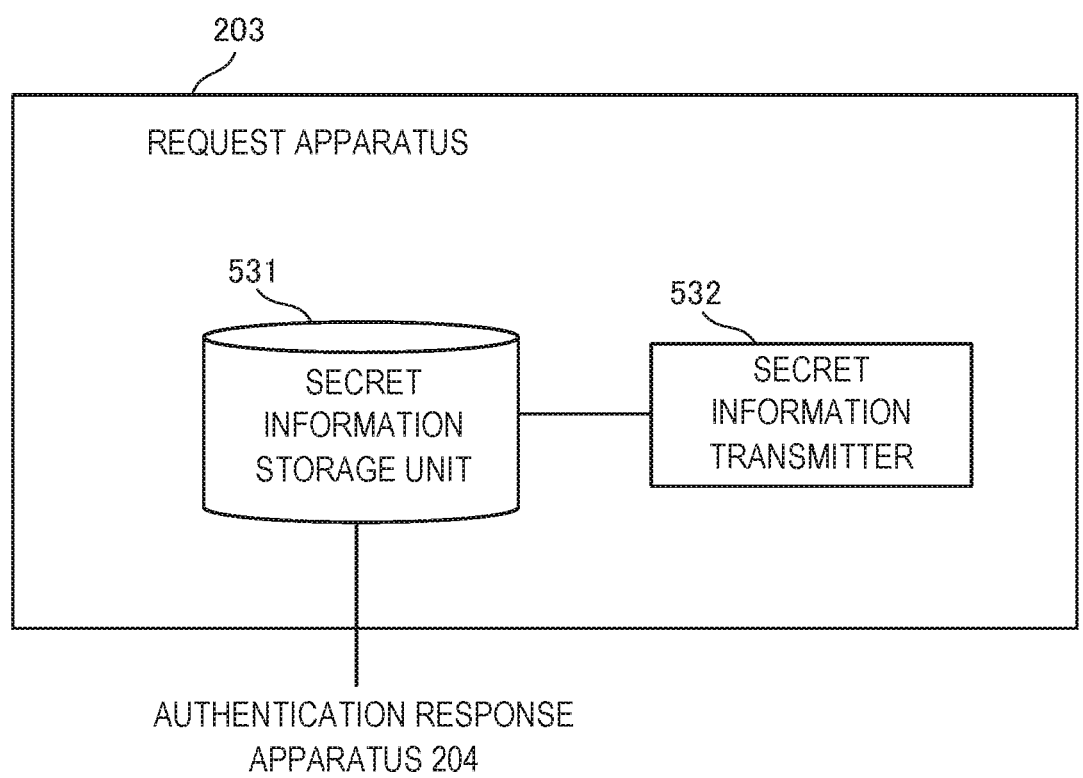
F I G. 5

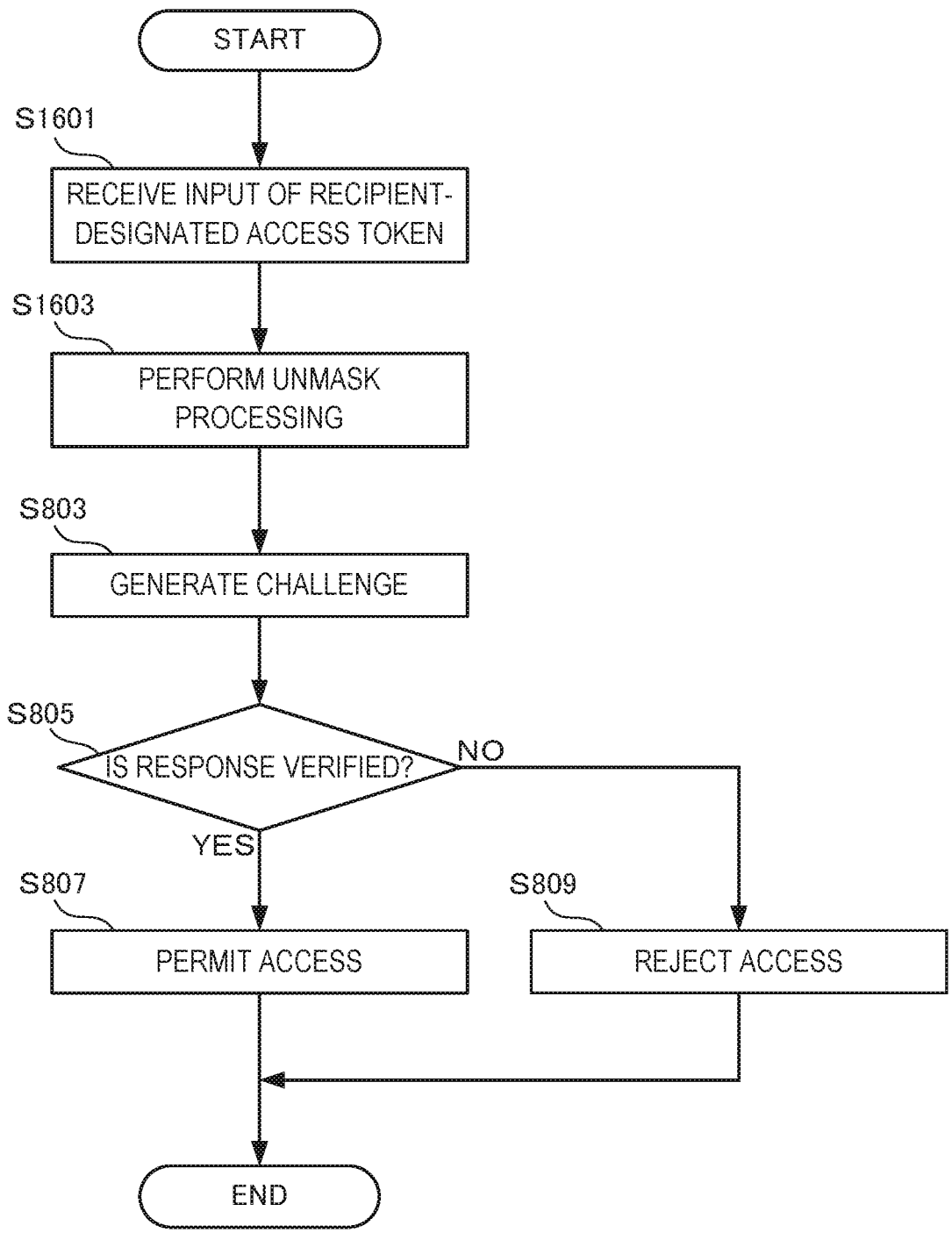
F I G. 16

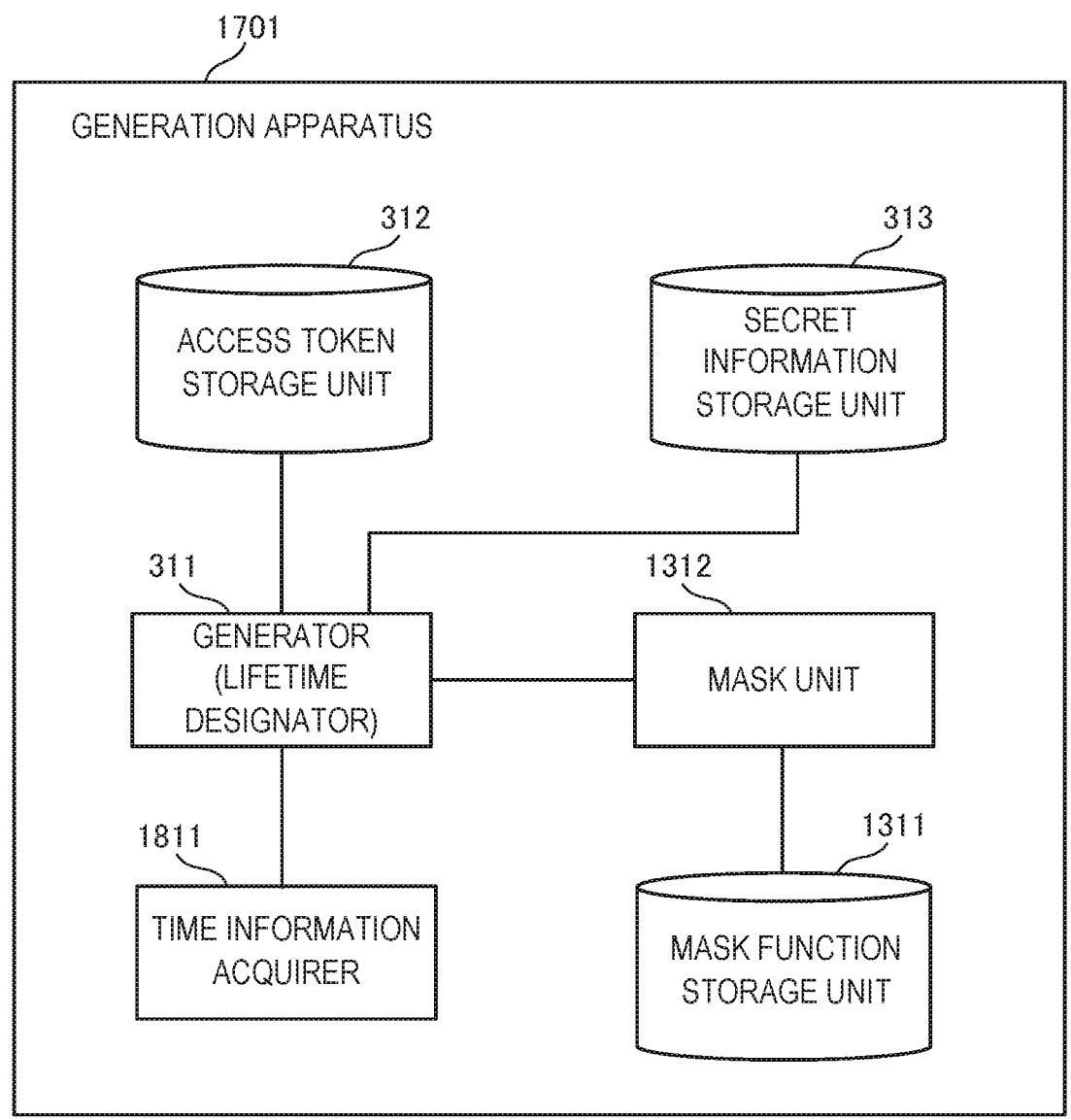
F I G. 18

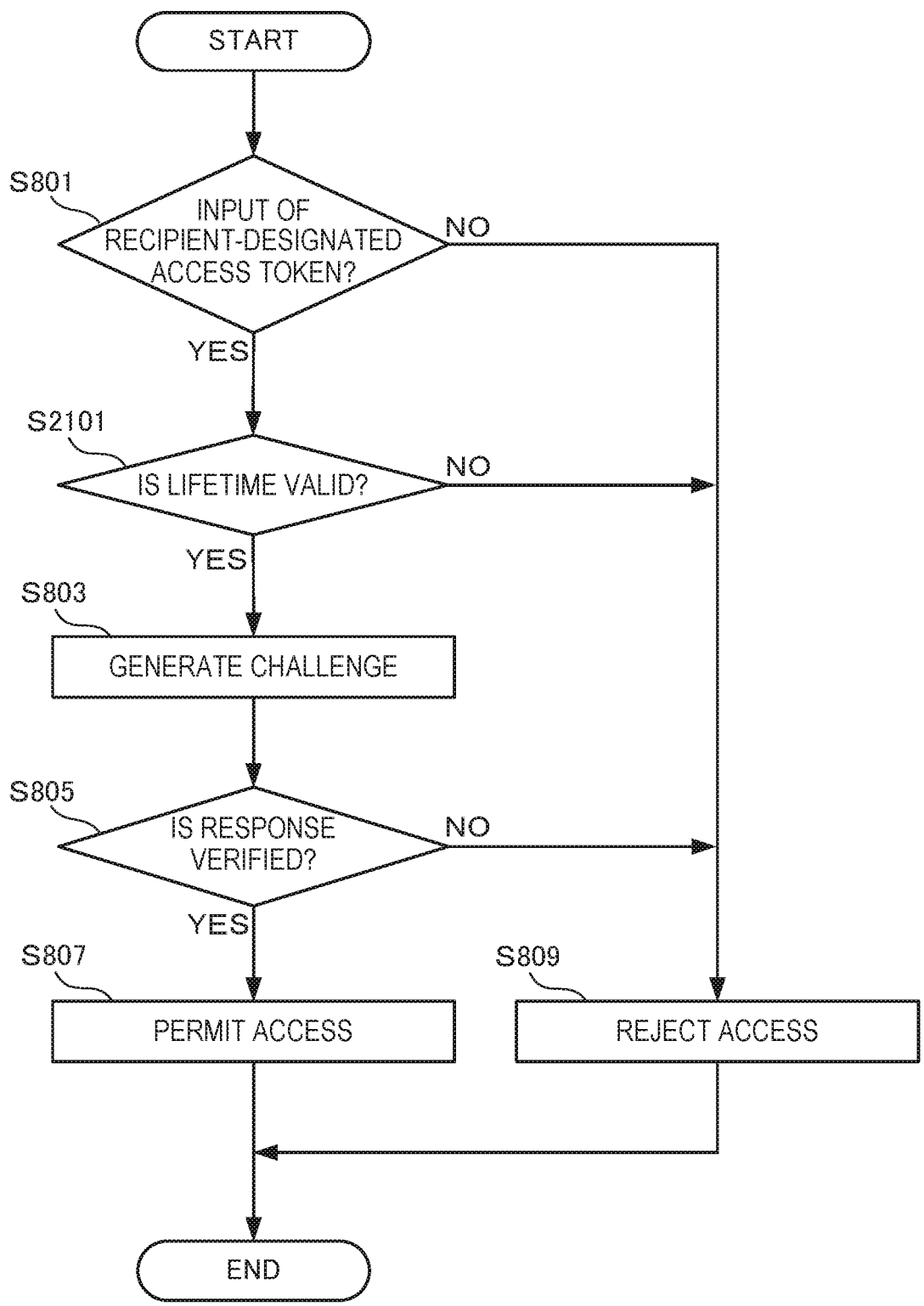
F I G. 21

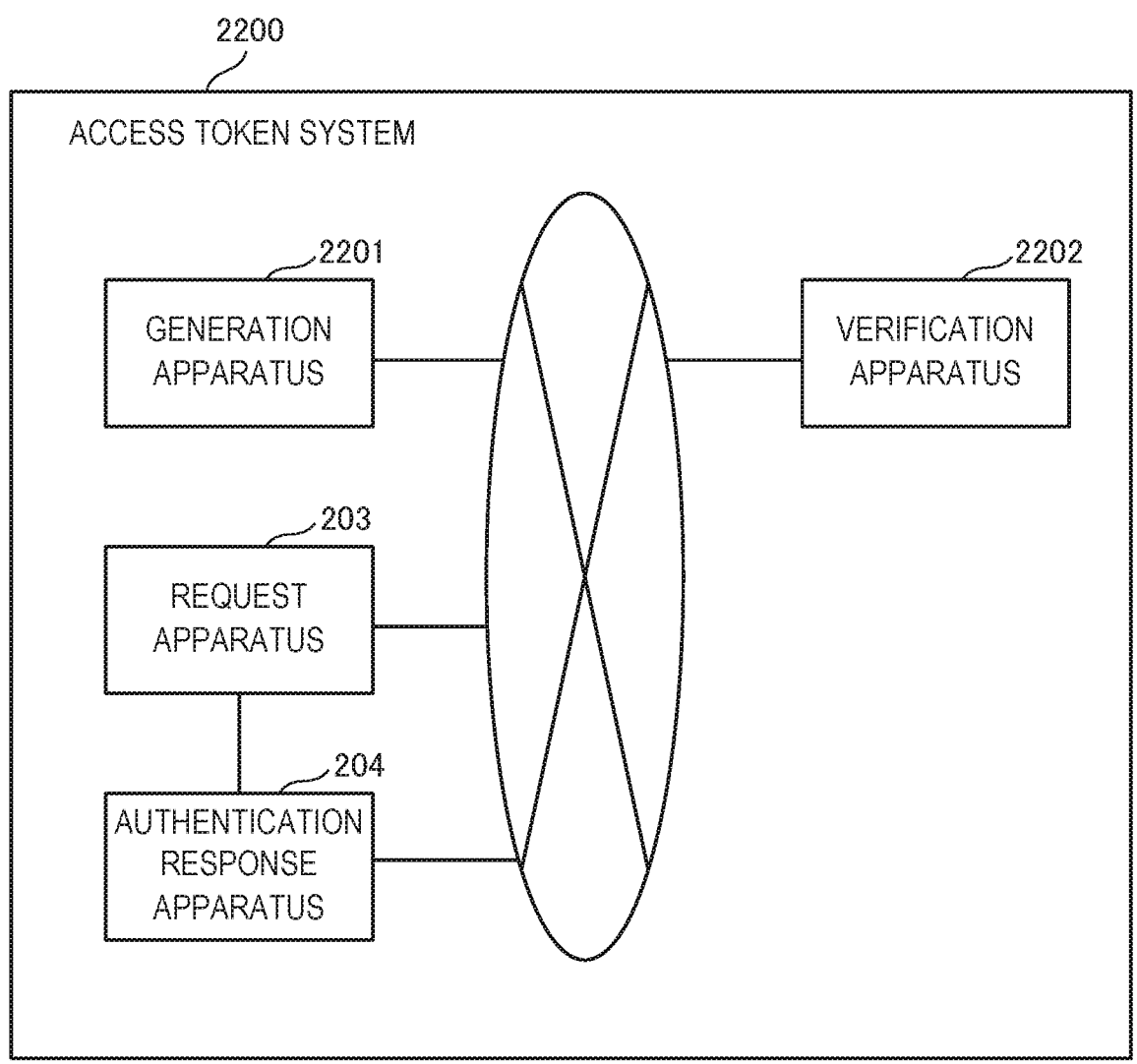
F I G. 22

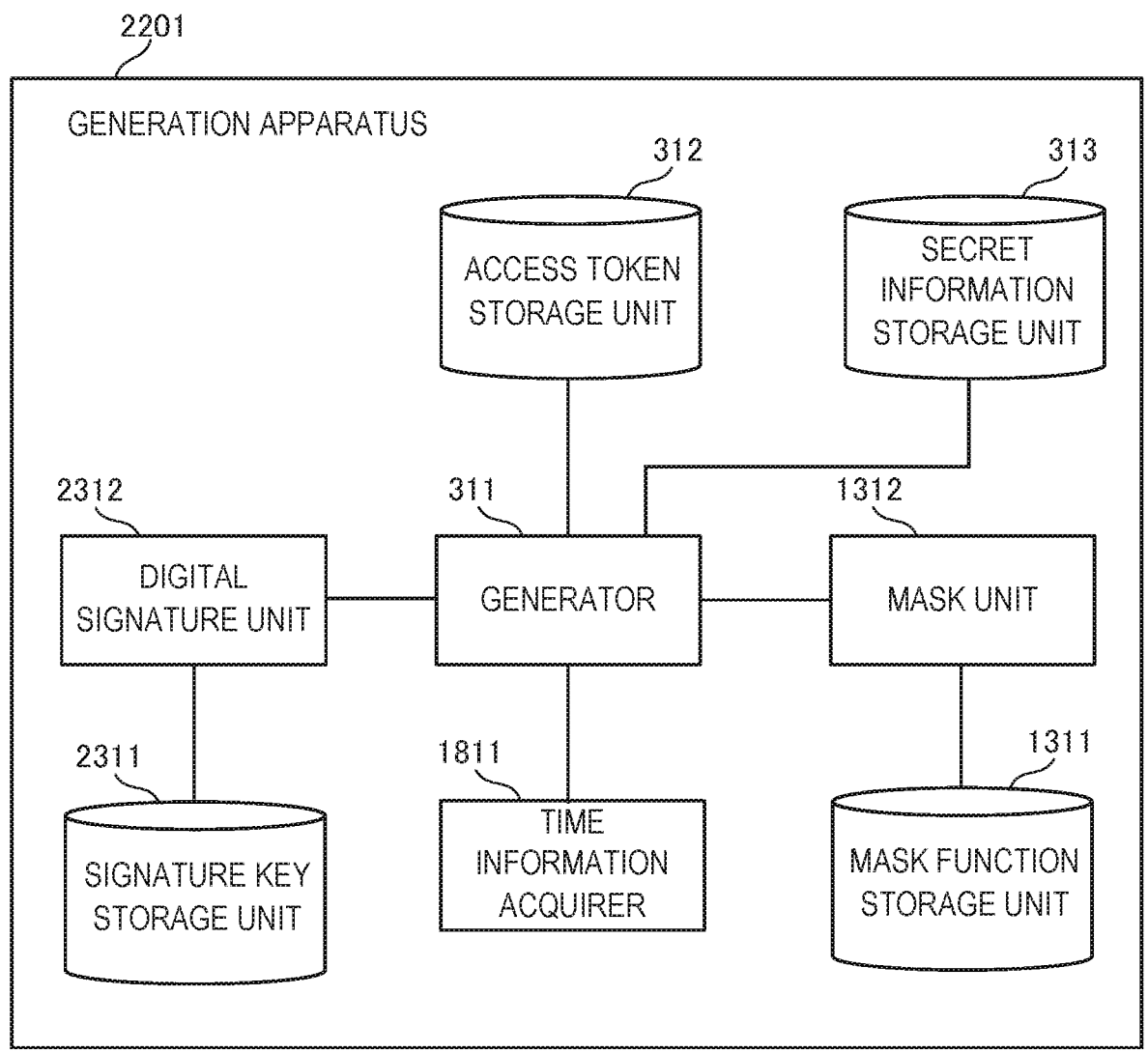
F I G. 23

SYSTEM, APPARATUS, METHOD AND PROGRAM FOR PREVENTING ILLEGAL DISTRIBUTION OF AN ACCESS TOKEN

This application is a National Stage Entry of PCT/JP2016/087381 filed on Dec. 15, 2016, the contents of all of which are incorporated herein by reference, in their entirety.

TECHNICAL FIELD

The present invention relates to an access token system, an information processing apparatus, an information processing method, and an information processing program.

BACKGROUND ART

In the above technical field, patent literature 1 discloses a technique related to an access token system as a technical premise. Patent literature 2 discloses a technique related to key generation in RSA encryption. Patent literature 3 discloses a technique of giving a user authentication key to a hash function. Patent literature 4 discloses a technique of authenticating a client using personal authentication information of the client registered in advance in a server. Patent literature 5 discloses a technique of preventing illegal access to an IC chip. Non-patent literatures 1 to 4 disclose access token systems as technical premises. Non-patent literature 5 discloses a technique related to an HMAC (Hash-based Message Authentication Code) as a digital signature. Non-patent literature 6 discloses an access token obtained by Base64-encoding a file in the JSON (JavaScript® Object Notation) format. Non-patent literature 7 discloses a technique related to a URL (Uniform Resource Locator) as an access token. Non-patent literature 8 discloses a technique related to a cookie as an access token.

CITATION LIST

Patent Literature

Patent literature 1: U.S. Patent Application Publication No. 2016/0127330
Patent literature 2: U.S. Pat. No. 4,405,829
Patent literature 3: Japanese Patent Laid-Open No. 10-222567
Patent literature 4: Japanese Patent Laid-Open No. 2005-301577
Patent literature 5: Japanese Patent Laid-Open No. 2009-212731

Non-Patent Literature

Non-patent literature 1: Create a URL Signature Using PHP-Amazon CloudFront. Amazon CloudFront. docs.aws.amazon.com/AmazonCloudFront/latest/DeveloperGuide/CreateURL_PHP.html
Non-patent literature 2: Creating Signed URLs with a Program Cloud Storage Documentation Google Cloud Platform. Google Cloud Platform. cloud.google.com/storage/docs/access-control/create-signed-urls-program
Non-patent literature 3: Use of Shared Access Signatures (SAS). Microsoft Azure. Microsoft Azure. azure.microsoft.com/ja-jp/documentation/articles/storage-dotnet-shared-access-signature-part-1/
Non-patent literature 4: Pre-Signed URLs-zaqar-specs 0.0.1.dev63 documentation. OpenStack Open Source Cloud Computing Software. specs.openstack.org/openstack/zaqar-specs/specs/liberty/pre-signed-url.html #pre-signed-url
Non-patent literature 5: Bellare, Mihir, Ran Canetti, and Hugo Krawczyk. "Keying hash functions for message authentication." Annual International Cryptology Conference. Springer Berlin Heidelberg, 1996.
Non-patent literature 6: T. Bray, Ed. The JavaScript® Object Notation (JSON) Data Interchange Format. RFC 7159, 3, 2014.
Non-patent literature 7: T. Berners-Lee. Uniform Resource Identifier (URI): Generic Syntax. RFC 3986, 1, 2005.
Non-patent literature 8: A. Barth. HTTP State Management Mechanism. RFC 6265, 4, 2011.

SUMMARY OF THE INVENTION

Technical Problem

In the techniques described in the above literatures, however, since the recipient of an access token is not designated, it is impossible to prevent illegal distribution of the access token.

The present invention enables to provide a technique of solving the above-described problem.

Solution to Problem

One example aspect of the present invention provides an access token system comprising:
a generator that generates, using secret information of a recipient, a recipient-designated access token for which the recipient is designated, and provides the recipient-designated access token to a user; and
a verifier that verifies that the user who makes access using the recipient-designated access token is the designated recipient.

Another example aspect of the present invention provides an information processing apparatus comprising:
a generator that generates, using secret information of a recipient, a recipient-designated access token for which the recipient is designated, and provides the recipient-designated access token to a user.

Still other example aspect of the present invention provides an information processing method comprising:
generating, using secret information of a recipient, a recipient-designated access token for which the recipient is designated, and providing the recipient-designated access token to a user.

Still other example aspect of the present invention provides an information processing program for causing a computer to execute a method, comprising:
generating, using secret information of a recipient, a recipient-designated access token for which the recipient is designated, and providing the recipient-designated access token to a user.

Advantageous Effects of Invention

According to the present invention, since the recipient of an access token is designated, it is possible to prevent illegal distribution of the access token.

BRIEF DESCRIPTION OF DRAWINGS

FIG. 5 is a block diagram for explaining the arrangement of a request apparatus of the access token system according to the second example embodiment of the present invention;

FIG. 16 is a flowchart for explaining the processing procedure of the verification apparatus of the access token system according to the third example embodiment of the present invention;

FIG. 18 is a block diagram showing the arrangement of a generation apparatus of the access token system according to the fourth example embodiment of the present invention;

FIG. 21 is a flowchart for explaining the processing procedure of the verification apparatus of the access token system according to the fourth example embodiment of the present invention;

FIG. 22 is a block diagram showing the arrangement of an access token system according to the fifth example embodiment of the present invention;

FIG. 23 is a block diagram showing the arrangement of a generation apparatus of the access token system according to the fifth example embodiment of the present invention;

DESCRIPTION OF EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

First Example Embodiment

An access token system 100 according to the first example embodiment of the present invention will be described with reference to FIG. 1. The access token system 100 is an access token system that can prevent illegal distribution of an access token.

Figure 1:
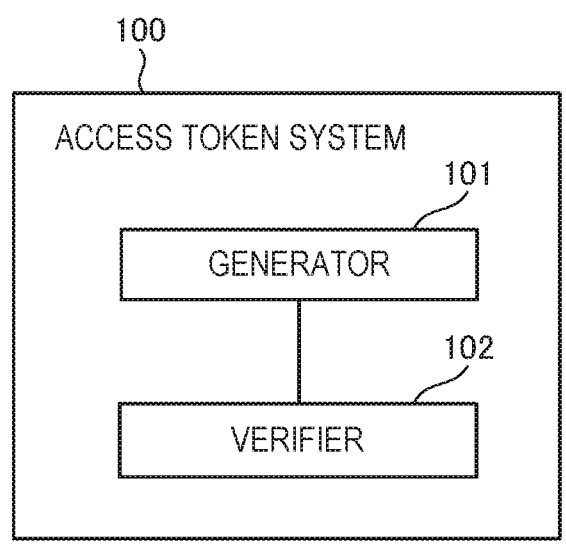
FIG. 1 is a block diagram showing the arrangement of an access token system according to the first example embodiment of the present invention.

As shown in FIG. 1, the access token system 100 includes a generator 101 and a verifier 102. The generator 101 generates, using secret information of a recipient, a recipient-designated access token for which the recipient is designated, and provides it to the user. The verifier 102 verifies that the user who makes access using the recipient-designated access token is the designated recipient.

According to this example embodiment, since a recipient-designated access token for which a recipient is designated is generated, it is possible to prevent illegal distribution of the access token.

Second Example Embodiment

An access token system according to the second example embodiment of the present invention will be described with reference to FIGS. 2 to 11.

[Explanation of Arrangement]

Figure 9:
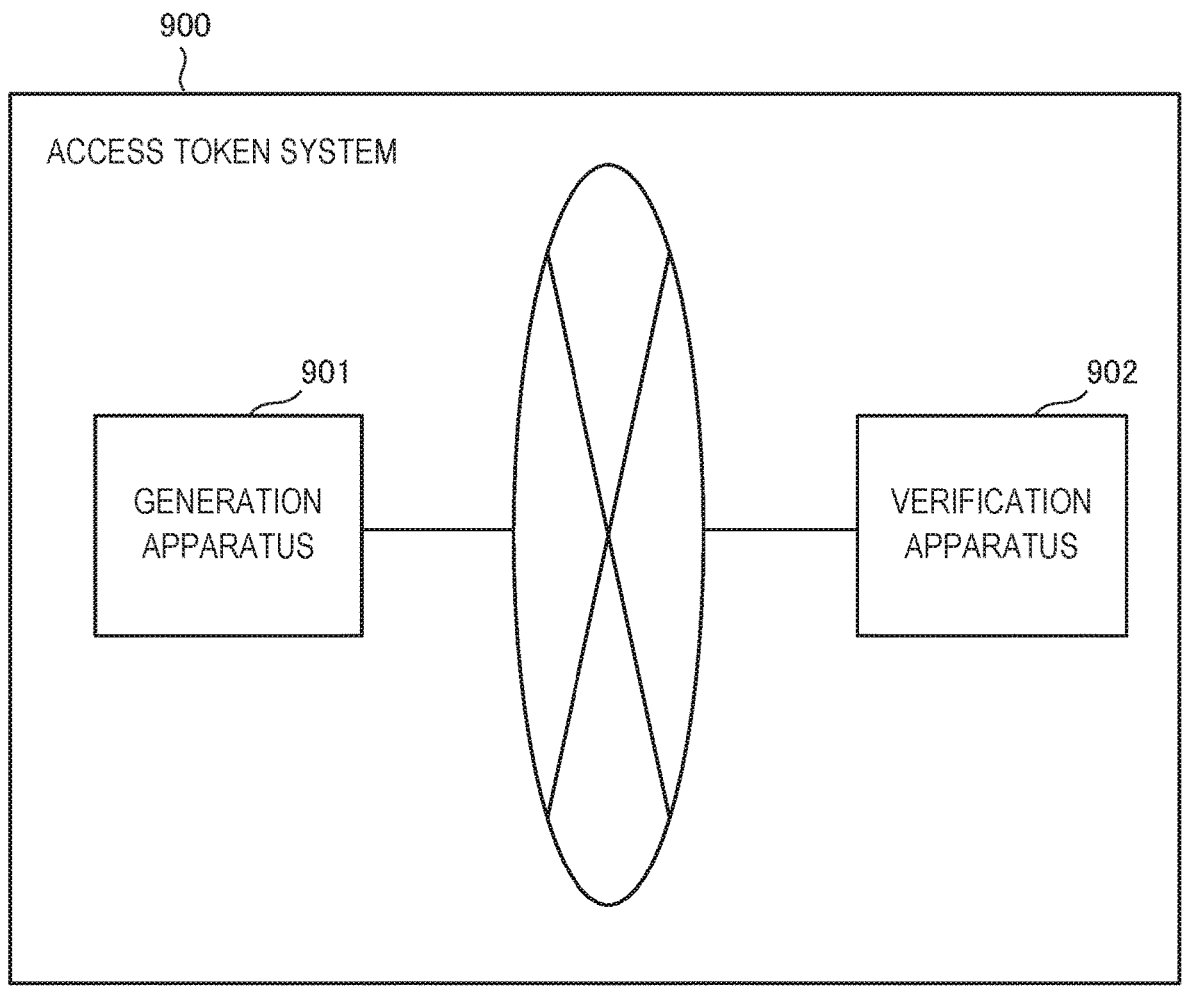
FIG. 9 is a block diagram showing the arrangement of an access token system according to a technical premise.

In IaaS (Infrastructure as a Service), there is a case in which it is desirable to delegate the authority to a user outside the system. In this case, there is generally known an access token system that implements delegation of the authority by setting a lifetime for an access token to a target resource, generating a digital signature for a character string (Policy) obtained by concatenating the access token and lifetime, and passing a value obtained by concatenating Policy and the digital signature to the user outside the system. For example, as shown in FIG. 9, an access token system 900 includes a generation apparatus 901 that generates an access token, and a verification apparatus 902 that verifies the validity of the access token. The generation apparatus 901 stores in advance a unit that acquires time information and a signature key in a digital signature. The verification apparatus 902 stores in advance a unit that acquires time information and a verification key in the digital signature. Examples of the conventional access token system are described in patent literature 1 and non-patent literatures 1, 2, 3, and 4.

Figure 10:
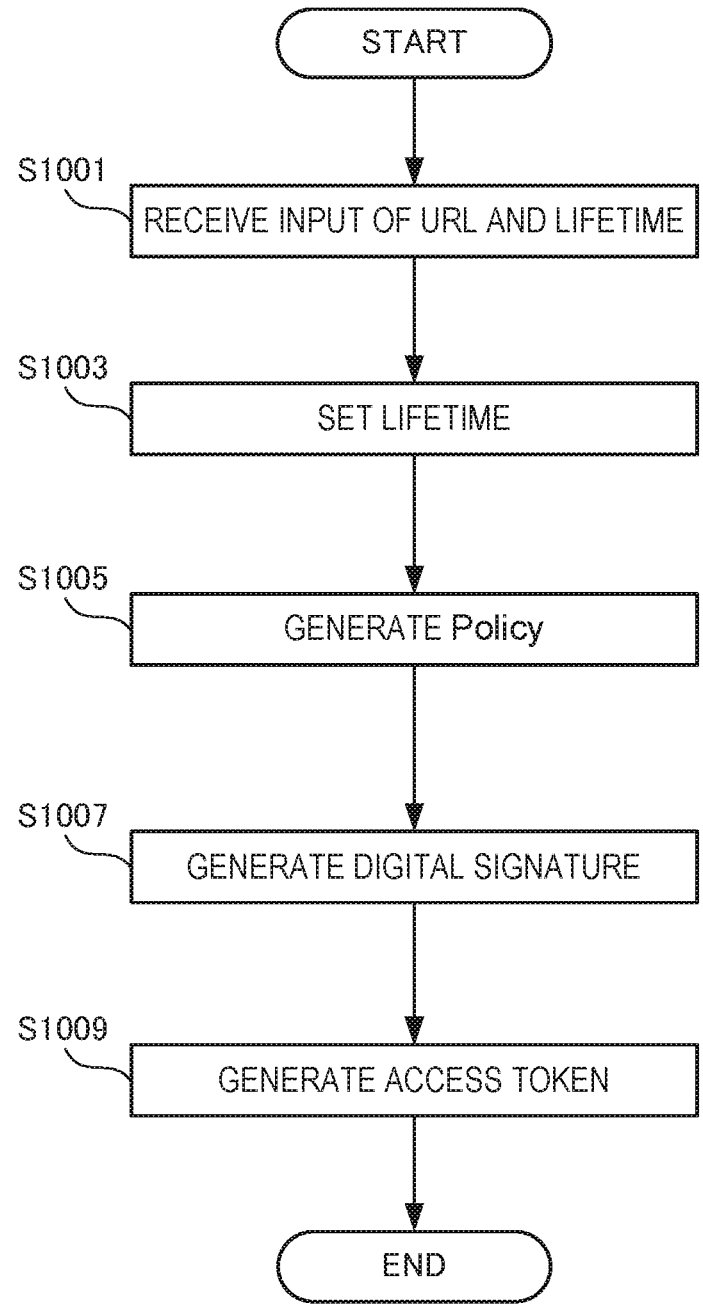
FIG. 10 is a flowchart for explaining the processing procedure of the access token system according to the technical premise.

A generation apparatus in the access token system described in non-patent literature 1 operates, as shown in, for example, FIG. 10. The generation apparatus receives an input of a lifetime and an access token to a target resource for which the authority is to be delegated (step S1001). The generation apparatus 901 sets a lifetime using a unit that acquires time information and the input of the lifetime (step S1003). Furthermore, the generation apparatus generates Policy using the access token to the target resource for which the authority is to be delegated, and the lifetime generated in step 2 (step S1005). Then, the generation apparatus generates a digital signature from the signature key and Policy stored in advance (step S1007). Finally, the generation apparatus generates an access token by concatenating Policy and the digital signature generated from Policy (step S1009).

Figure 11:
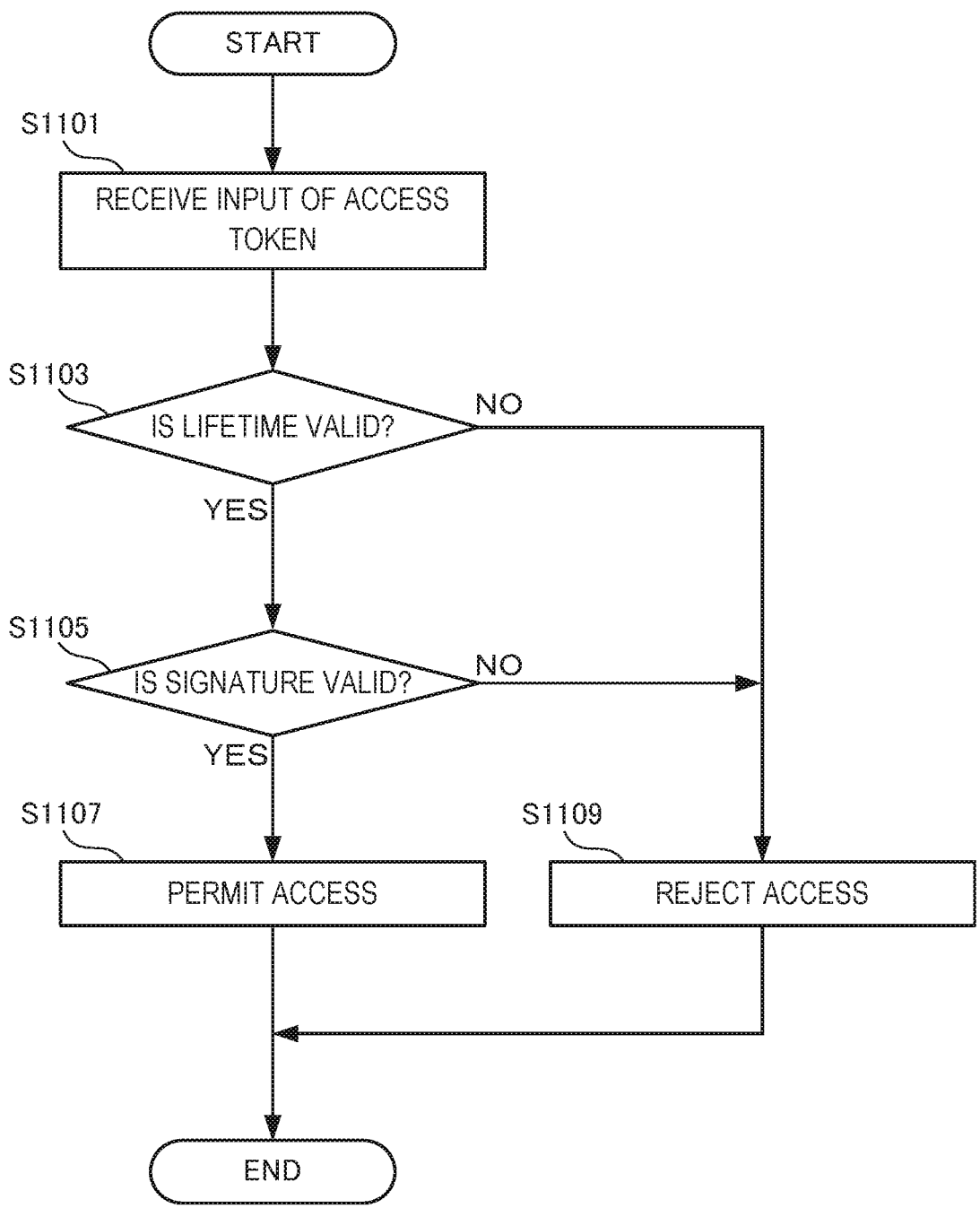
FIG. 11 is a flowchart for explaining the processing procedure of the access token system according to the technical premise.

On the other hand, a verification apparatus in the access token system described in non-patent literature 1 operates, as shown in, for example, FIG. 11. The verification apparatus receives an input of an access token (step S1101). Next, the verification apparatus determines whether the access token received as the input from the unit that acquires a lifetime included in the input access token and the time information stored in advance is valid within the lifetime (step S1103). At this time, if it is determined that the access token is not valid, the verification apparatus rejects access to the target resource (step S1109). Furthermore, based on a digital signature included in the input access token and the verification key stored in advance, the verification apparatus verifies whether the digital signature is valid (step S1105). If, as a result of the verification, it is determined that the digital signature is not valid, the verification apparatus rejects access to the target resource (step S1109). Finally, the verification apparatus permits access to the target resource (step S1107).

There are roughly two forms of the access token system. One is described in non-patent literatures 1 and 2, in which a signature key stored in a generation apparatus is different from a verification key stored in a verification apparatus. The other is described in non-patent literatures 3 and 4, in which a signature key stored in a generation apparatus is the same as a verification key stored in a verification apparatus.

In the access token systems described in patent literature 1 and non-patent literatures 1, 2, 3, and 4, if a malicious recipient illegally distributes (=illegally diverts), to an unspecified large number of people, an access token output from the generation apparatus, authority delegation unintended by an access token issuer may occur. That is, illegal access may be made. This problem is pointed out in non-patent literature 3. Under present circumstances, as described in non-patent literature 3, this problem is coped with by setting a short lifetime for an access token but it is impossible to prevent illegal diversion.

In the above-described access token systems described in patent literature 1 and non-patent literatures 1, 2, 3, and 4, authority delegation unintended by an access token issuer occurs by distributing the access token illegally. This is caused by designating no recipient for the access token.

In addition, in the above access token systems described in patent literature 1 and non-patent literatures 1, 2, 3, and 4, a lifetime needs to be set short in order to prevent illegal distribution of an access token.

Figure 2:
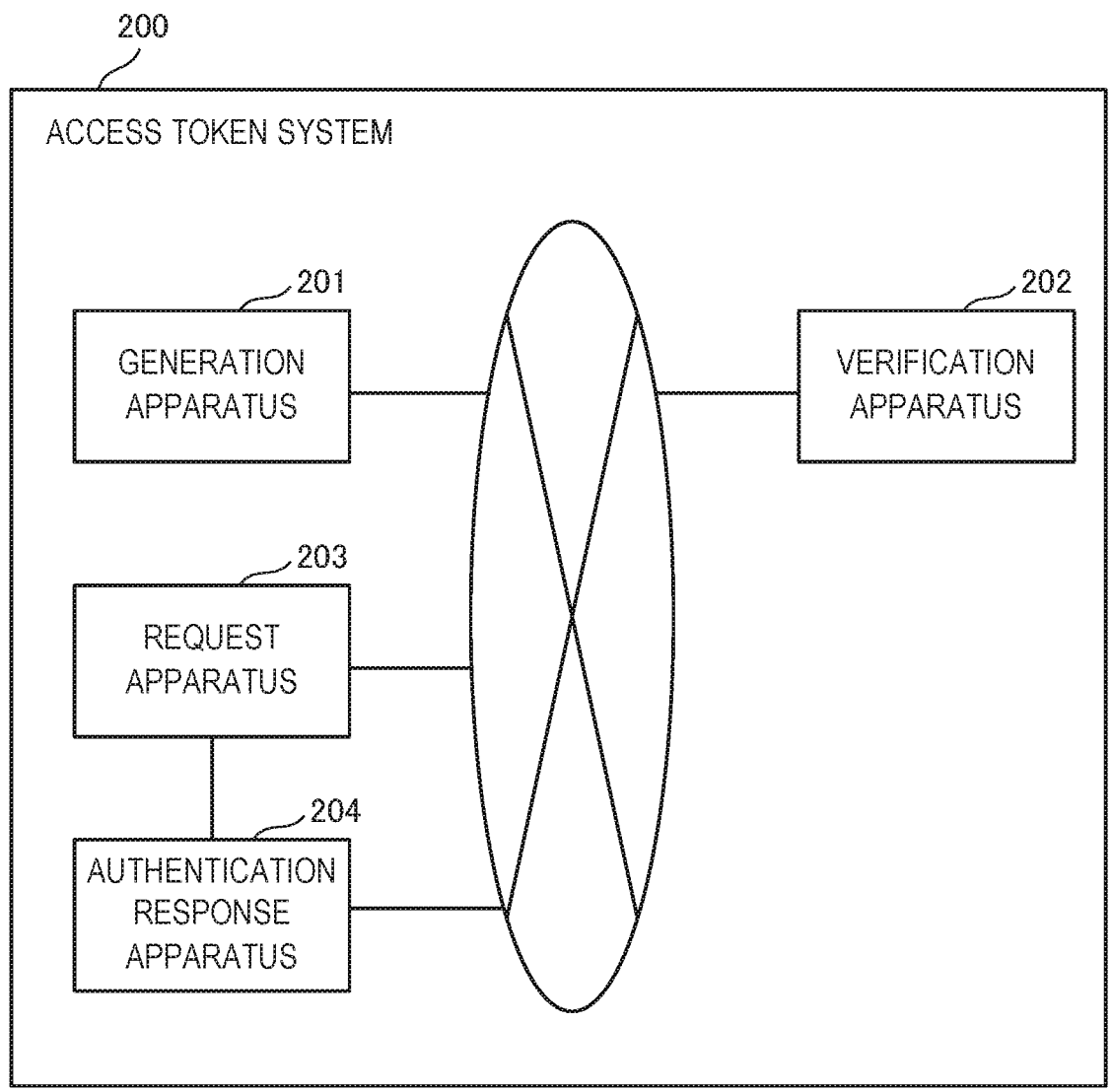
FIG. 2 is a block diagram showing the arrangement of an access token system according to the second example embodiment of the present invention.

FIG. 2 is a block diagram showing the arrangement of an access token system 200 according to this example embodiment. As shown in FIG. 2, the access token system 200 includes a generation apparatus 201, a verification apparatus 202, a request apparatus 203, and an authentication response apparatus 204. The generation apparatus 201, the verification apparatus 202, and the request apparatus 203 are communicably connected via an external network. Furthermore, the request apparatus 203 and the authentication response apparatus 204 are communicably connected.

Figure 3:
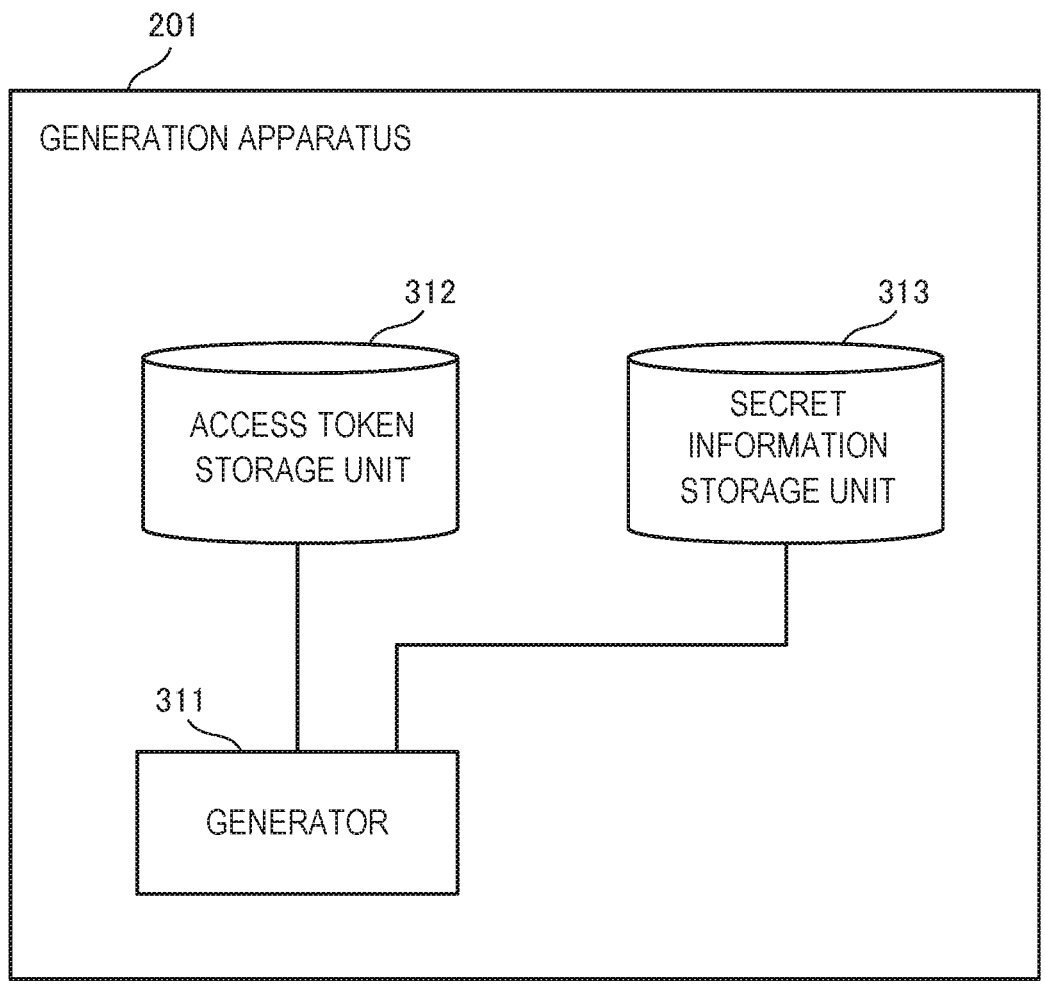
FIG. 3 is a block diagram for explaining the arrangement of a generation apparatus of the access token system according to the second example embodiment of the present invention.

FIG. 3 is a block diagram for explaining the arrangement of the generation apparatus 201 of the access token system 200 according to this example embodiment. As shown in FIG. 3, the generation apparatus 201 includes a generator 311, an access token storage unit 312, and a secret information storage unit 313. The generator 311 is connected to the access token storage unit 312 and the secret information storage unit 313.

The generator 311 receives, at an input, a value output from the access token storage unit 312, and generates a character string (Policy). Furthermore, the generator 311 receives, at the input, a value output from the secret information storage unit 313. The generator 311 embeds, in the hash value of Policy, the inverse element of a value obtained by processing the input secret information. The hash value is calculated using a hash function shared between the generation apparatus 201 and the verification apparatus 202.

When the secret information is processed, for example, secret information b and a processing function $\varphi$ of the secret information are assumed. At this time, $\varphi$ represents a function whose inverse function can be calculated efficiently. A practical example of $\varphi$ is given by:

$$\varphi(b, r_1) = b \| r_1 \quad (1)$$

where $r_1$ represents a random number for padding.

$$\| \quad (2)$$

Expression (2) above represents a concatenation operator of bit strings. If b is processed by $\varphi$ to have a sufficient length, that is, the secret information in the access token is processed to have almost the same bit length as that of a portion corresponding to the hash value in which the inverse element of the value obtained by processing the secret information is embedded, it is possible to prevent b from leaking to a server by round robin. The generator 311 processes the value obtained by processing the input secret information so that only the generator 311 can calculate the inverse element, and embeds the processed value in the hash value of Policy.

For example, like key generation in RSA encryption described in patent literature 2, the inverse element is calculated by performing processing by:

$$\varphi(b,r_1)(\varphi(b,r_1))^{-1} \equiv 1 \bmod (p-1)(q-1) \quad (3)$$

Then, a hash value H(Policy) of Policy is embedded with $$(H(\text{Policy}))^{(\varphi(b,r_1))^{-1}} \bmod N (= pq) \quad (4)$$

At this time, p and q are sufficiently large prime numbers different from each other. Assume that N is open to the public. At this time, only the generator 311 that knows p and q can calculate the inverse element, and difficulty of inverse element calculation is ensured by difficulty of prime factorization. Only at the initial setup, p, q, and N are selected. It is unnecessary to reselect p, q, and N every time an access token is generated.

The generator 311 passes, as a recipient-designated access token, to a recipient who has requested, that is, a recipient who is the owner of the request apparatus 203 and the owner (=designated recipient) of the value output from the secret information storage unit 313, the function used to process the secret information, the second argument of the function, and a value obtained by concatenating Policy and the value that has been processed so that only the generator 311 can calculate the inverse element, and has been embedded in the hash value of Policy. The concatenated value is given by:

$$\text{Policy} \| \left( (H(\text{Policy}))^{(\varphi(b, r_1))^{-1}} \bmod N \right) \quad (5)$$

Particularly, the function used to process the secret information and the second argument of the function, for example, $\varphi$ and $r_1$ described above are stored in the authentication response apparatus 204.

Note that Policy is for an access token to a resource, which is obtained by Base64-encoding a file in the JSON format described in non-patent literature 6. The hash function is, for example, a full-domain hash function.

The access token storage unit 312 receives, from an input device (not shown), an input of an access token to the target resource, and stores the access token. When generating an access token for the input access token, the access token storage unit 312 outputs the input access token to the generator 311. Examples of the access token are a URL described in non-patent literature 7 and a cookie described in non-patent literature 8.

The secret information storage unit 313 receives, from an input device (not shown), an input of secret information output from the request apparatus 203, and stores the secret information. When generating an access token for the input secret information, the secret information storage unit 313 outputs the input secret information to the generator 311. Examples of the secret information are a credit card number and a license number.

Figure 4:
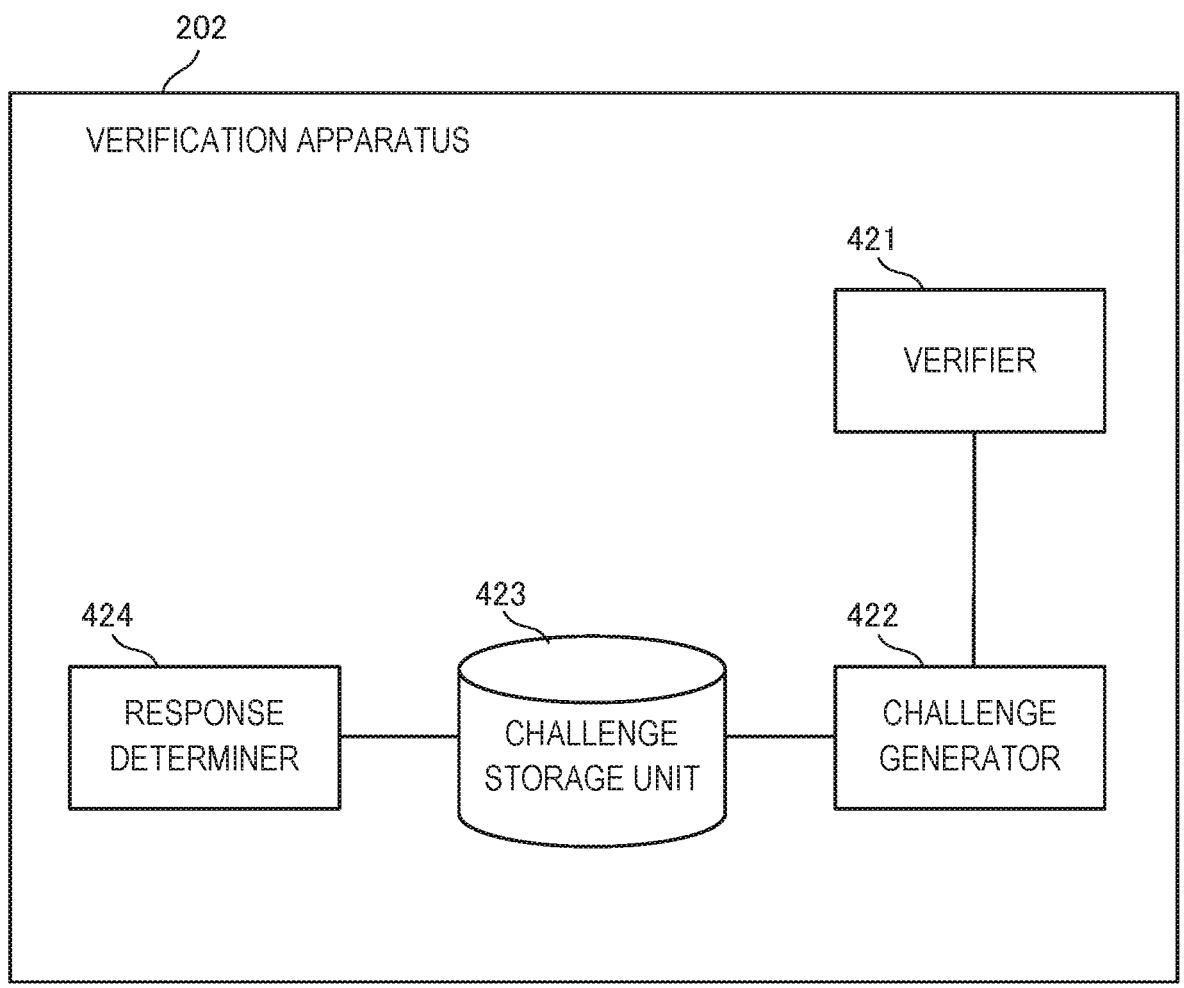
FIG. 4 is a block diagram for explaining the arrangement of a verification apparatus of the access token system according to the second example embodiment of the present invention.

FIG. 4 is a block diagram for explaining the arrangement of the verification apparatus 202 of the access token system 200 according to this example embodiment. As shown in FIG. 4, the verification apparatus 202 includes a verifier 421, a challenge generator 422, a challenge storage unit 423, and a response determiner 424. The challenge generator 422 is connected to the verifier 421 and the challenge storage unit 423. The challenge storage unit 423 is connected to the response determiner 424.

The verifier 421 receives, at an input, a recipient-designated access token output from an input device (not shown). The recipient-designated access token includes neither a secret information processing function nor its second argument. The verifier 421 extracts, from the recipient-designated access token, Policy and a hash value in which the inverse element of a value obtained by processing secret information is embedded. The verifier 421 calculates a hash value for extracted Policy. If the calculated hash value matches the hash value in which the inverse element of the value obtained by processing the secret information is embedded, access is rejected; otherwise, the verifier 421 outputs the input value to the challenge generator 422.

The challenge generator 422 generates a challenge for the value output from the verifier 421, and embeds the challenge. For example, when c represents the challenge, the value given by expression (6) below undergoes processing given by expression (7) below.

$$(H(\text{Policy}))^{(\varphi(b, r_1))^{-1}} \bmod N \quad (6)$$

$$(H(\text{Policy}))^{c(\varphi(b, r_1))^{-1}} \bmod N \quad (7)$$

The challenge generator 422 transmits, to the authentication response apparatus 204, a value obtained by embedding the challenge in the portion of the hash value in which the inverse element of the value obtained by processing the secret information in the recipient-designated access token is embedded. In addition, the challenge generator 422 calculates a hash value using the shared hash function for the Policy portion of the value output from the verifier 421, and embeds the challenge c in the hash value. For example, the challenge generator 422 performs processing given by:

$$(H(\text{Policy}))^c \bmod N \quad (8)$$

The challenge generator 422 outputs, to the challenge storage unit 423, a value obtained by embedding the challenge c in the hash value.

The challenge storage unit 423 receives, at an input, the value output from the challenge generator 422. The challenge storage unit 423 stores/holds the input value for a specified time. To determine, when a response is returned from the user who makes access using the recipient-designated access token, whether the response is correct, the challenge storage unit 423 outputs the stored value to the response determiner 424.

The response determiner 424 receives, at an input, the value output/transmitted from the authentication response apparatus 204. If the input value matches the value stored in the challenge storage unit 423, the response determiner 424 permits access by the user who has transmitted the value using the authentication response apparatus 204; otherwise, access is rejected.

FIG. 5 is a block diagram for explaining the arrangement of the request apparatus 203 of the access token system 200 according to this example embodiment. As shown in FIG. 5, the request apparatus 203 includes a secret information storage unit 531 and a secret information transmitter 532.

The secret information storage unit 531 receives, as an input, secret information of a recipient who requests an access token from an input device (not shown). The secret information storage unit 531 holds the input value. When it is desirable to generate a response for the challenge transmitted from the verification apparatus 202, the secret information storage unit 531 outputs the held value to the authentication response apparatus 204. Furthermore, when requesting to issue an access token, the secret information storage unit 531 outputs the held value to the secret information transmitter 532. Assume that the secret information is a value which avoids being known by others, such as a credit card number or license number.

The secret information transmitter 532 receives, at an input, the value output from the secret information storage unit 531. The secret information transmitter 532 transmits the input value to the generation apparatus 201. At this time, the secret information transmitter 532 is required to secretly transmit the value output from the secret information storage unit 531 so the value is not tapped.

Figure 6:
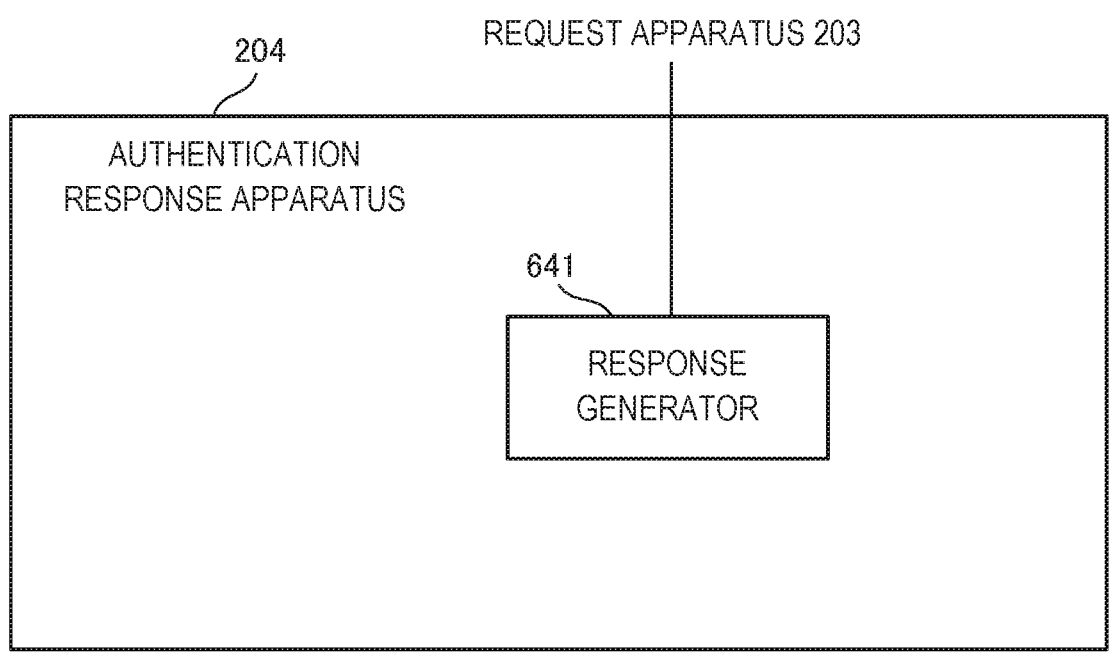
FIG. 6 is a block diagram for explaining the arrangement of an authentication response apparatus of the access token system according to the second example embodiment of the present invention.

FIG. 6 is a block diagram for explaining the arrangement of the authentication response apparatus 204 of the access token system 200 according to this example embodiment. As shown in FIG. 6, the authentication response apparatus 204 includes a response generator 641. Note that the response generator 641 is connected to the secret information storage unit 531 shown in FIG. 5.

The response generator 641 receives, at an input, the value output from the secret information storage unit 531. The response generator 641 generates a value by processing the secret information using the input value and the secret information processing function stored in the authentication response apparatus 204. For example, if the secret information b, the secret information processing function φ, and the second argument $r_1$ are used, $\varphi(b, r_1)$ represents a value obtained by processing the secret information. Next, the response generator 641 generates, using the value obtained by processing the secret information, a response to the value transmitted by the challenge generator 422. For example, the challenge generator 422 performs processing given by equation (10) below using the value $\varphi(b, r_1)$ obtained by processing the secret information, and the portion, given by expression (9) below, of the hash value in which the inverse element of the value obtained by processing the secret information in the recipient-designated access token is embedded.

$$(H(\text{Policy}))^{c(\varphi(b,r_1))^{-1}} \tag{9}$$

$$(H(\text{Policy}))^{c(\varphi(b,r_1))^{-1}\varphi(b,r_1)} = (H(\text{Policy}))^c \bmod N \tag{10}$$

That is, the response is given by:

$$(H(\text{Policy}))^C \bmod N \tag{11}$$

The response generator 641 transmits the response to the response determiner 424.

[Explanation of Operation]

Figure 7:
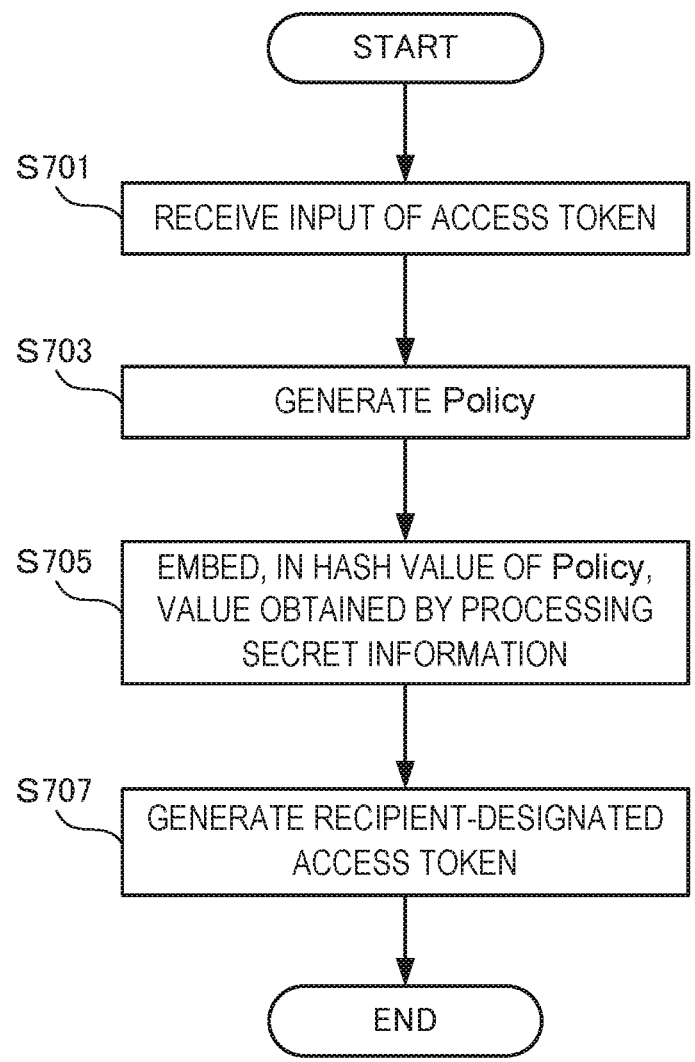
FIG. 7 is a flowchart for explaining the processing procedure of the generation apparatus of the access token system according to the second example embodiment of the present invention.

FIG. 7 is a flowchart for explaining the processing procedure of the generation apparatus 201 of the access token system 200 according to this example embodiment. The access token storage unit 312 receives, from an input device (not shown), an input of an access token to a target resource. Then, the access token storage unit 312 outputs the input to the generator 311 (step S701). The generator 311 generates Policy using the input obtained from the access token storage unit 312 (step S703).

The secret information storage unit 313 outputs the stored secret information to the generator 311. The generator 311 receives, at the input, the output from the secret information storage unit 313. The generator 311 embeds, in the hash value of Policy, the inverse element of a value obtained by processing the input secret information (step S705). The generator 311 combines, with the secret information processing function and a value used as the second argument of the function, a value obtained by concatenating the Policy portion and the value obtained by embedding, in the hash value of Policy, the inverse element of the value obtained by processing the secret information, and outputs the thus obtained value as a recipient-designated access token (step S707).

Figure 8:
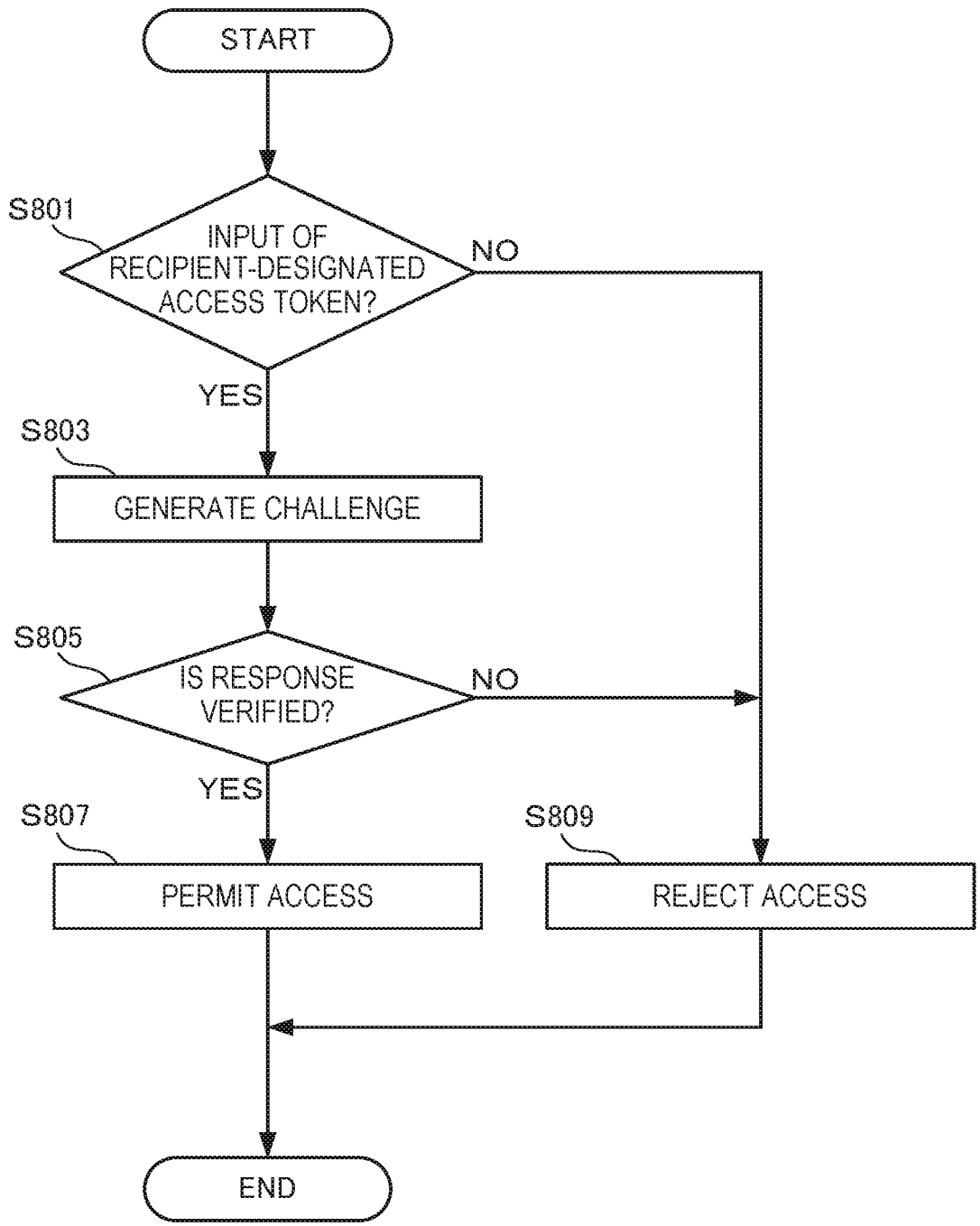
FIG. 8 is a flowchart for explaining the processing procedure of the verification apparatus of the access token system according to the second example embodiment of the present invention.

FIG. 8 is a flowchart for explaining the processing procedure of the verification apparatus 202 of the access token system 200 according to this example embodiment.

The verifier 421 receives a recipient-designated access token at an input. Note that the recipient-designated access token includes neither the secret information processing function nor its second argument. The verifier 421 obtains a hash value for Policy included in the input, and compares the obtained value with the value in which the inverse element of the value obtained by processing the secret information included in the input is embedded (step S801). If the values match each other, access is rejected (step S809); otherwise, the verifier 421 passes, to the challenge generator 422, the value obtained by embedding, in the hash value of Policy included in the input recipient-designated access token, the inverse element of the value obtained by processing the secret information. The challenge generator 422 generates a challenge using the input value. The challenge generator 422 passes, to the user who has attempted to make access using the recipient-designated access token, a value in which the generated challenge is embedded, and passes the challenge itself to the challenge storage unit 423 (step S803). The response determiner 424 receives, at an input, a response generated by the user who has attempted to make access using the recipient-designated access token, and the challenge output from the challenge storage unit 423. The response determiner 424 determines, using the input values, whether the response is correct (step S805). If, as a result of the determination processing, the response is not correct, access is rejected (step S809). If the response is correct, access is permitted (step S807).

[Explanation of Effect]

The access token system 200 according to this example embodiment causes the generator 311 to embed, in the hash value of Policy, the inverse element of the value obtained by processing the secret information of the recipient output from the secret information storage unit 313. This can designate the recipient for an access token. Since only the secret information storage unit 313 can calculate the inverse element of the value obtained by processing the secret information of the recipient, the designation of the recipient cannot be canceled. When attempting to make access using the access token for which the recipient is designated, challenge-response is executed.

Since the response generator 641 uses the value output from the secret information storage unit 531 to generate a response, only the recipient having the secret information (correctly, the value obtained by processing the secret information) can generate a response. Furthermore, since the inverse function of the secret information processing function can readily be calculated, when the value obtained by processing the secret information and the recipient-designated access token are distributed to an unspecified large number of people, a person who knows the secret information processing function can know the original secret information from the value obtained by processing the secret information. This can suppress illegal distribution of the access token by a malicious recipient. Particularly, when the secret information processing function is known, anyone can obtain the original secret information from the value obtained by processing the secret information, and thus the suppression effect is improved.

In addition, when illegal distribution of an access token by a malicious recipient can be prevented, it is unnecessary to shorten the lifetime to prevent illegal distribution, and an unlimited lifetime can be set.

Third Example Embodiment

Figure 12:
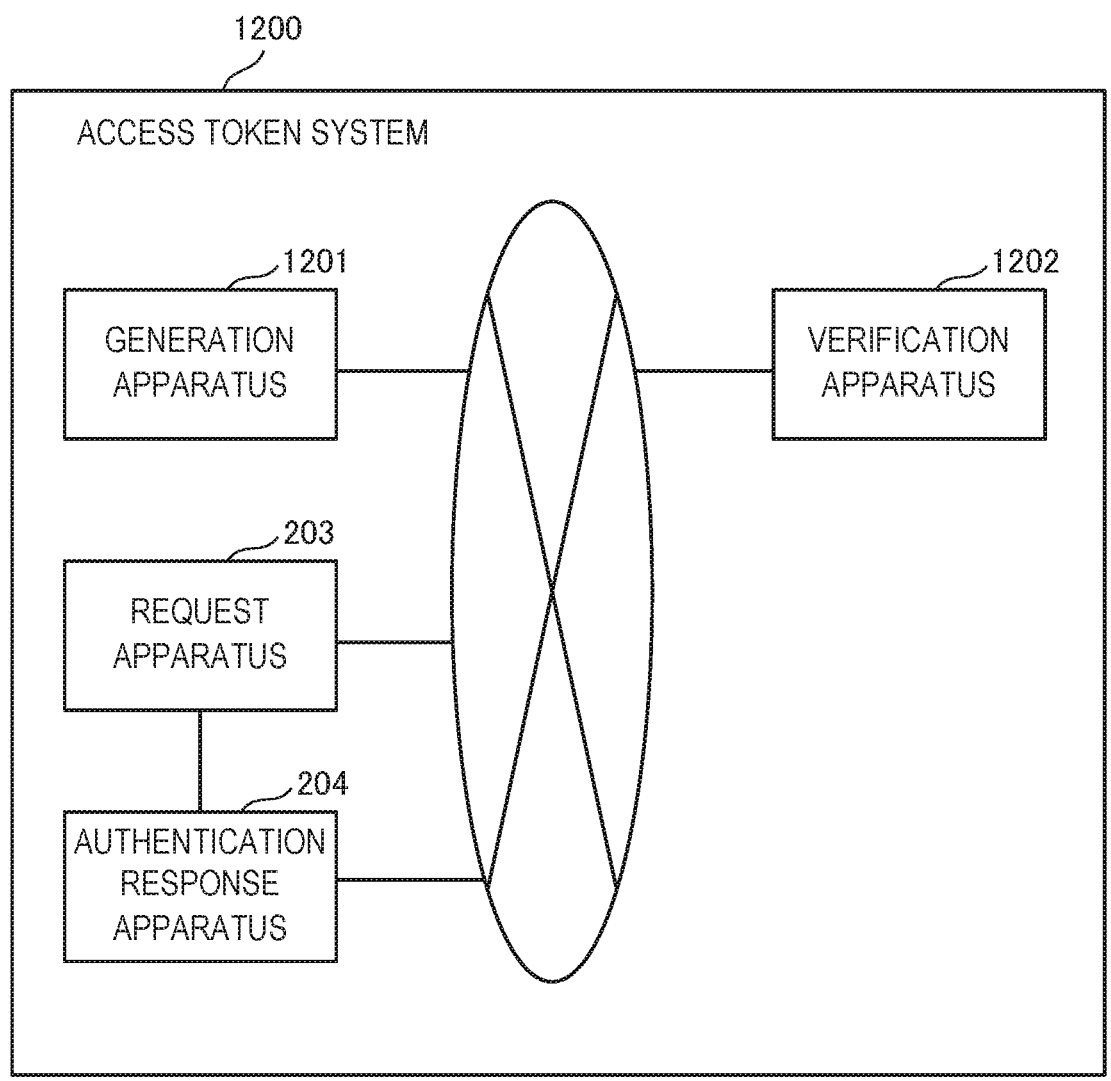
FIG. 12 is a block diagram showing the arrangement of an access token system according to the third example embodiment of the present invention.

An access token system according to the third example embodiment of the present invention will be described next with reference to FIGS. 12 to 16. FIG. 12 is a block diagram showing the arrangement of an access token system according to this example embodiment. The access token system according to this example embodiment is different from that in the second example embodiment in that a generation apparatus includes a mask function storage unit and a mask unit and a verification apparatus includes an unmask function storage unit and an unmask unit. The remaining components and operations are the same as those in the second example embodiment. Hence, the same reference numerals denote the same components and operations, and a detailed description thereof will be omitted.

[Explanation of Arrangement]

As shown in FIG. 12, an access token system 1200 according to this example embodiment includes a generation apparatus 1201, a verification apparatus 1202, a request apparatus 203, and an authentication response apparatus 204. The generation apparatus 1201, the verification apparatus 1202, and the request apparatus 203 are communicably connected via an external network. The request apparatus 203 and the authentication response apparatus 204 are communicably connected.

Figure 13:
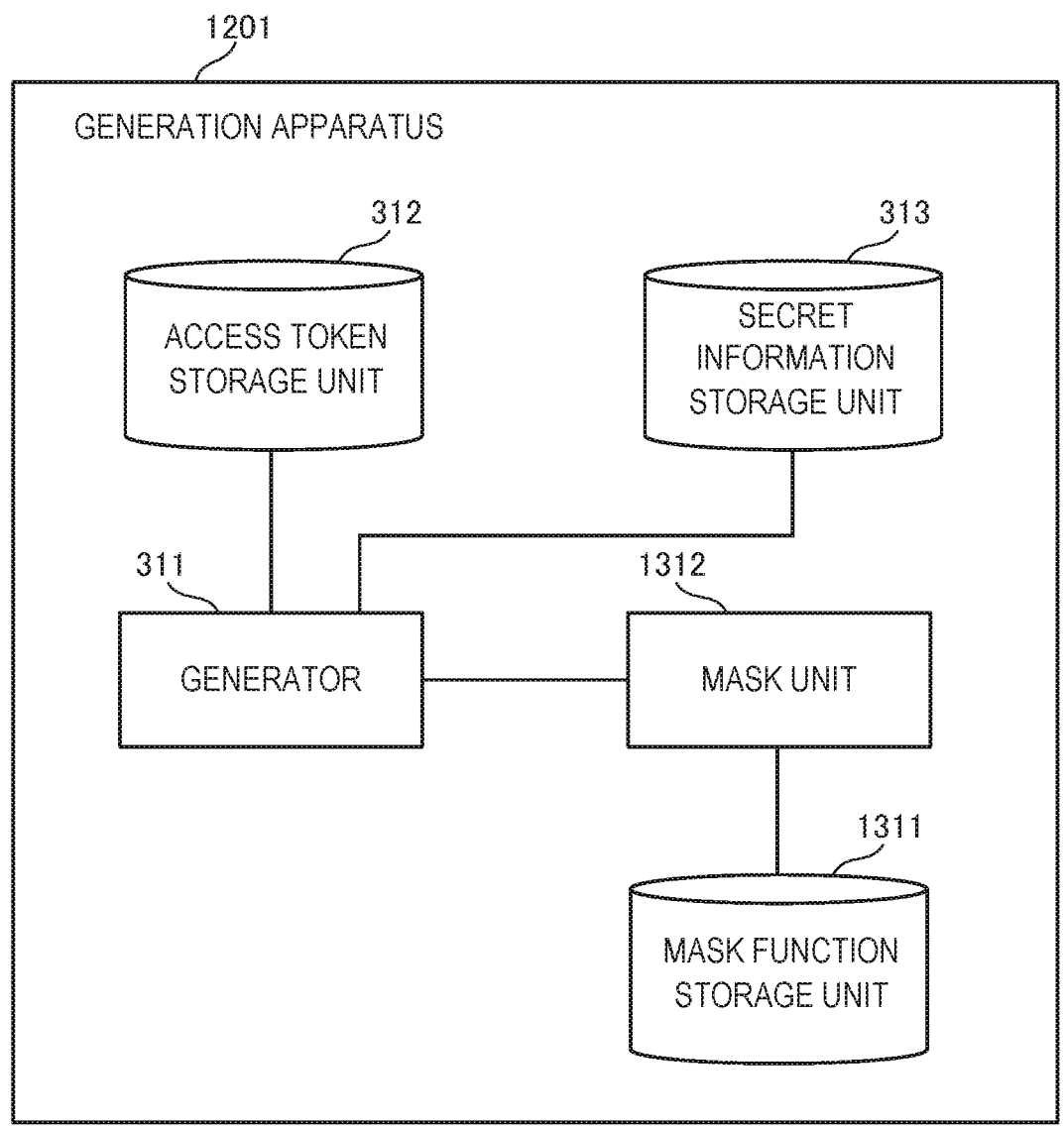
FIG. 13 is a block diagram showing the arrangement of a generation apparatus of the access token system according to the third example embodiment of the present invention.

FIG. 13 is a block diagram showing the arrangement of the generation apparatus 1201 of the access token system 1200 according to this example embodiment. As shown in FIG. 13, the generation apparatus 1201 further includes a mask function storage unit 1311 and a mask unit 1312. A generator 311 is connected to the mask unit 1312, an access token storage unit 312, and a secret information storage unit 313. The mask unit 1312 is connected to the mask function storage unit 1311.

The generator 311 receives, at an input, a value output from the access token storage unit 312, and generates a character string (Policy). Furthermore, the generator 311 receives, at an input, a value output from the secret information storage unit 313. The generator 311 embeds, in the hash value of Policy, the inverse element of a value obtained by processing the input secret information. The hash value is calculated using a hash function shared between the generation apparatus 1201 and the verification apparatus 1202.

When the secret information is processed, for example, secret information b and a processing function y of the secret information are assumed. At this time, φ represents a function whose inverse function can be calculated efficiently. A practical example of φ is given by:

$$\varphi(b,r_1)=b\|r_1 \quad (12)$$

where $r_1$ represents a random number for padding $$\| \quad (13)$$

Expression (13) above represents a concatenation operator of bit strings. If b is processed by φ to have a sufficient length, that is, the secret information in the access token is processed to have almost the same bit length as that of a portion corresponding to the hash value in which the inverse element of the value obtained by processing the secret information is embedded, it is possible to prevent b from leaking to a server by round robin. The generator 311 embeds, in the hash value of Policy, the inverse element of the value obtained by processing the input secret information. Embedding, in the hash value of Policy, the inverse element of the value obtained by processing the secret information indicates embedding, in a hash value H(Policy) of Policy, the value given by:

$$(H(\text{Policy}))^{(\varphi(b,r_1))^{-1}} \mod q \quad (14)$$

At this time, assume that q is a sufficiently large prime number, and is open to the public. Only at the initial setup, q is selected. It is unnecessary to reselect q every time an access token is generated. The generator 311 passes, to the mask unit 1312, a value obtained by embedding, in the hash value of Policy, the inverse element of the value obtained by processing the secret information.

The mask unit 1312 receives, at an input, a mask function stored in the mask function storage unit 1311 and the value obtained by embedding, in the hash value of Policy, the inverse element of the value obtained by processing the secret information, and output from the generator 311. The mask unit 1312 passes, to the mask function received at the input, the value obtained by embedding, in the hash value of Policy, the inverse element of the value obtained by processing the secret information and received at the input, and obtains the value of the mask function. For example, the mask unit 1312 passes, to the mask function, a value obtained by Base64-decoding the value obtained by embedding, in the hash value of Policy, the inverse element of the value obtained by processing the secret information and received at the input, and Base64-encodes the output of the mask function again. A value obtained by concatenating the value output from the mask function with Policy, the function used to process the secret information, and the second argument of the function are set as a recipient-designated access token. The mask unit 1312 outputs the recipient-designated access token. The output recipient-designated access token is passed to the delegation destination of the authority, that is, the owner (=designated recipient) of the value output from the secret information storage unit 313. Particularly, the function used to process the secret information and the second argument of the function, for example, φ and $r_1$ described above are stored in the authentication response apparatus 204.

Note that Policy is for an access token to a resource, which is obtained by Base64-encoding a file in the JSON format. The hash function is, for example, a full-domain hash function.

The mask function storage unit 1311 receives, at an input, from an input device (not shown), a function for masking a portion, of the access token output from the generator 311, corresponding to the value obtained by embedding, in the hash value of Policy, the inverse element of the value obtained by processing the secret information, and stores the function. The mask function is a function that prevents the inverse element of the value obtained by processing the secret information from being removed or altered, that is, a function that prevents the designation of the recipient from being canceled/altered. For example, the power and XOR (Exclusive OR) processing are performed for a secret value $r_2$ shared between an access token issuer having the generation apparatus 1201 and a server including the verification apparatus 1202 and a portion corresponding to the value obtained by embedding, in the hash value of Policy, the inverse element of the value obtained by processing the secret information. For example, the portion corresponding to the value obtained by embedding, in the hash value of Policy, the inverse element of the value obtained by processing the secret information is given by:

$$(H(\text{Policy}))^{(\varphi(b,r_1))^{-1}} \mod q \quad (15)$$

In this case, a masked value is given by:

$$((H(\text{Policy}))^{(\varphi(b,r_1))^{-1}+r_2} \oplus r_2 \bmod q) \tag{16}$$

The access token storage unit 312 receives, from an input device (not shown), an input of an access token to a target resource, and stores the access token. When generating an access token for the input access token, the access token storage unit 312 outputs the input access token to the generator 311. Examples of the access token are a URL and a cookie.

The secret information storage unit 313 receives, from an input device (not shown), an input of secret information output from the request apparatus 203, and stores the secret information. When generating an access token for the input secret information, the secret information storage unit 313 outputs the input secret information to the generator 311. Examples of the secret information are a credit card number and a license number.

Figure 14:
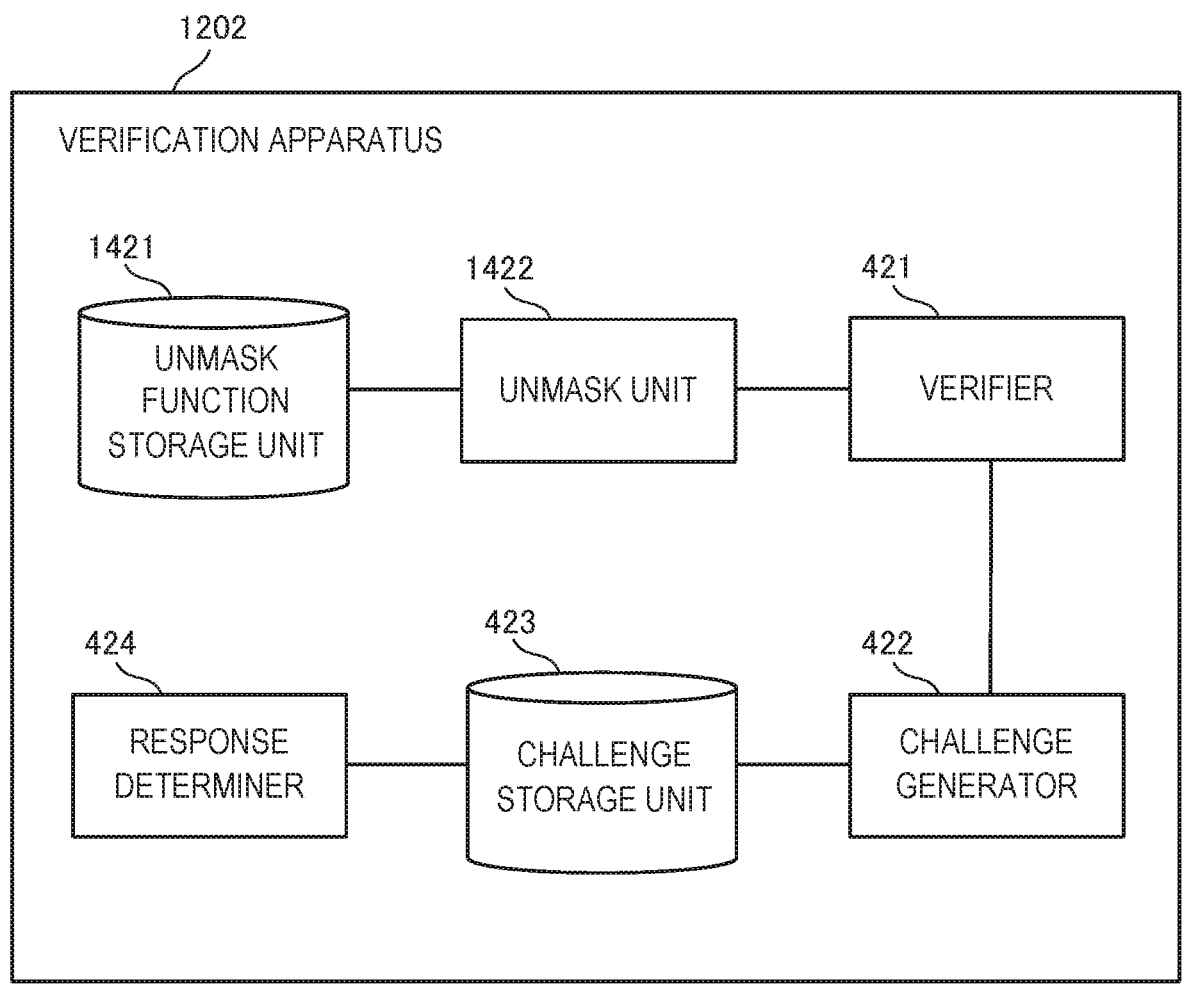
FIG. 14 is a block diagram showing the arrangement of a verification apparatus of the access token system according to the third example embodiment of the present invention.

FIG. 14 is a block diagram showing the arrangement of the verification apparatus 1202 of the access token system 1200 according to this example embodiment.

As shown in FIG. 14, the verification apparatus 1202 further includes an unmask function storage unit 1421 and an unmask unit 1422. The unmask unit 1422 is connected to the unmask function storage unit 1421 and a verifier 421.

The unmask function storage unit 1421 receives, at an input, the inverse function of the mask function stored in the mask function storage unit 1311, and stores the inverse function. When performing unmask processing for the recipient-designated access token, the unmask function storage unit 1421 outputs the stored inverse function to the unmask unit 1422.

The unmask unit 1422 receives, at an input, the masked value output from the verifier 421 and the unmask function input from the unmask function storage unit 1421. The masked value is passed to the unmask function, and the value obtained by embedding, in the hash value of Policy, the inverse element of the value obtained by processing the secret information is extracted. For example, a portion corresponding to the masked value is represented by δ and given by:

$$((H(\text{Policy}))^{(\varphi(b,r_1))^{-1}+r_2} \oplus r_2 \bmod q) \tag{17}$$

At this time, the unmask processing is given by:

$$(\delta \oplus r_2 \bmod q) \cdot ((H(\text{Policy}))^{-r_2} \bmod q) \tag{18}$$

A portion corresponding to the extracted value is given by:

$$(H(\text{Policy}))^{(\varphi(b,r_1))^{-1}} \bmod q \tag{19}$$

The extracted value is output to the verifier 421.

The verifier 421 receives, at an input, a recipient-designated access token output from an input device (not shown). The recipient-designated access token includes neither a secret information processing function nor its second argument. The verifier 421 extracts the masked value from the recipient-designated access token. The verifier 421 outputs the extracted masked value to the unmask unit 1422. Upon receiving a value output from the unmask unit 1422, the verifier 421 outputs, to a challenge generator 422, Policy included in the input recipient-designated access token and the value output from the unmask unit 1422.

The challenge generator 422 generates a challenge for the value output from the verifier 421, and embeds the challenge. For example, when c represents the challenge, the value given by expression (20) below undergoes processing given by expression (21) below.

$$(H(\text{Policy}))^{(\varphi(b,r_1))^{-1}} \bmod N \tag{20}$$

$$(H(\text{Policy}))^{c(\varphi(b,r_1))^{-1}} \bmod N \tag{21}$$

The challenge generator 422 transmits, to the authentication response apparatus 204, a value obtained by embedding the challenge in the portion of the hash value in which the inverse element of the value obtained by processing the secret information in the recipient-designated access token is embedded. In addition, the challenge generator 422 calculates a hash value using the shared hash function for the Policy portion of the value output from the verifier 421, and embeds the challenge c in the hash value. For example, the challenge generator 422 performs processing given by:

$$(H(\text{Policy}))^c \bmod q \tag{22}$$

The challenge generator 422 outputs, to a challenge storage unit 423, a value obtained by embedding the challenge c in the hash value.

The challenge storage unit 423 receives, at an input, the value output from the challenge generator 422. The challenge storage unit 423 stores/holds the input value for a specified time. To determine, when a response is returned from the user who makes access using the recipient-designated access token, whether the response is correct, the challenge storage unit 423 outputs the stored value to a response determiner 424.

The response determiner 424 receives, at an input, the value output/transmitted from the authentication response apparatus 204. If the input value matches the value stored in the challenge storage unit 423, the response determiner 424 permits access by the user who has transmitted the value using the authentication response apparatus 204; otherwise, access is rejected.

[Explanation of Operation]

Figure 15:
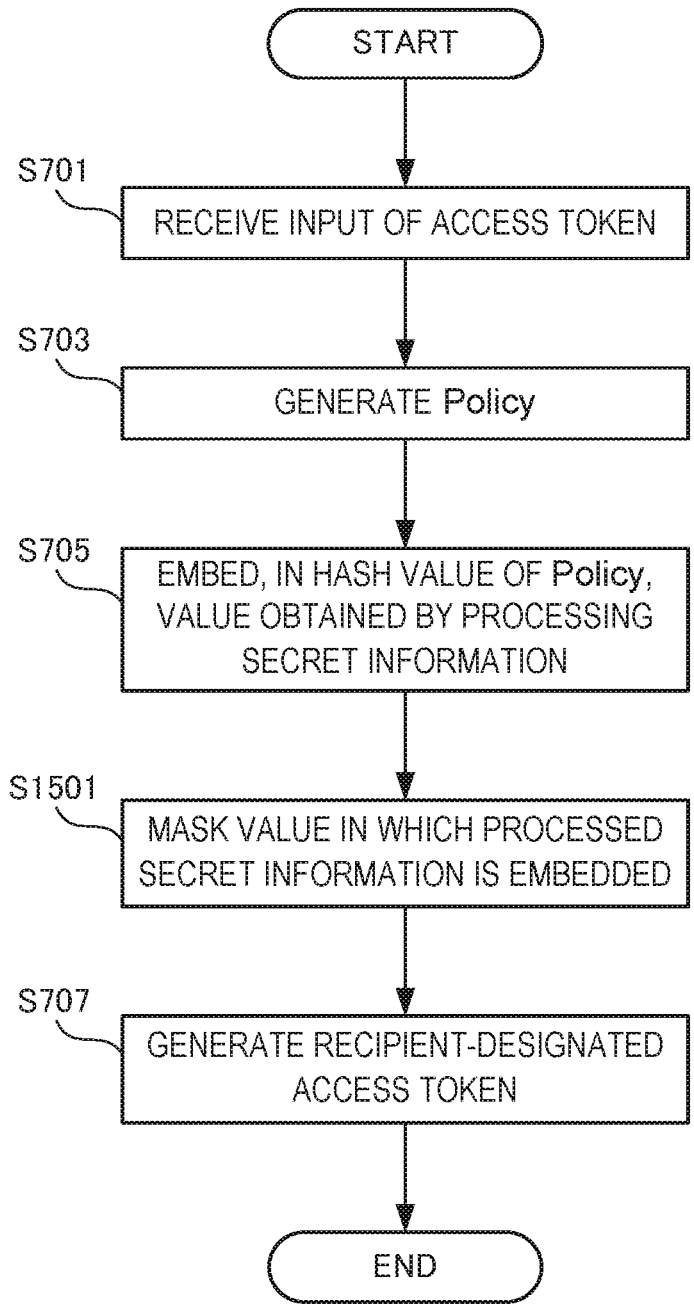
FIG. 15 is a flowchart for explaining the processing procedure of the generation apparatus of the access token system according to the third example embodiment of the present invention.

FIG. 15 is a flowchart for explaining the processing procedure of the generation apparatus 1201 of the access token system 1200 according to this example embodiment.

The access token storage unit 312 receives, from an input device (not shown), an input of an access token to a target resource. Then, the access token storage unit 312 outputs the input to the generator 311 (step S701). The generator 311 generates Policy using the input obtained from the access token storage unit 312 (step S703).

The secret information storage unit 313 outputs the stored secret information to the generator 311. The generator 311 receives, at the input, the output from the secret information storage unit 313. The generator 311 embeds, in the hash value of Policy, the inverse element of a value obtained by processing the input secret information (step S705). The mask unit 1312 receives, at the input, the mask function passed from the mask function storage unit 1311 and the value obtained by embedding, in the hash value of Policy, the inverse element of the value obtained by processing the secret information output from the generator 311. The mask unit 1312 passes, to the input mask function, the value obtained by embedding, in the hash value of Policy, the inverse element of the value obtained by processing the input secret information, thereby calculating a masked value (step S1501). The mask unit 1312 outputs the masked value to the generator 311. The generator 311 outputs, as a recipient-designated access token, a value obtained by concatenating Policy with the input, the function used to process the secret information, and the second argument of the function (step S707).

FIG. 16 is a flowchart for explaining the processing procedure of the verification apparatus 1202 of the access token system 1200 according to this example embodiment.

The verifier 421 receives a recipient-designated access token at the input. Note that the recipient-designated access token includes neither the secret information processing function nor its second argument (step S1601). The unmask unit 1422 receives, at the input, a masked value included in the input recipient-designated access token and the unmask function input from the unmask function storage unit 1421. Then, the unmask unit 1422 passes the masked value included in the input recipient-designated access token to the input unmask function, thereby unmasking the value. The unmask unit 1422 outputs the unmasked value to the verifier 421 (step S1603).

The verifier 421 outputs, to the challenge generator 422, Policy included in the recipient-designated access token input in step S1601 and the unmasked value input in step S1603. The challenge generator 422 generates a challenge using the input values. The challenge generator 422 passes, to a user who has attempted to make access using the recipient-designated access token, a value in which the generated challenge is embedded, and passes Policy and the challenge itself to the challenge storage unit 423 (step S803). The response determiner 424 receives, at an input, a response generated by the user who has attempted to make access using the recipient-designated access token, and Policy and the challenge output from the challenge storage unit 423. The response determiner 424 determines, using the input values, whether the response is correct (step S805). If, as a result of the determination processing, the response is not correct, access is rejected (step S809). If the response is correct, access is permitted (step S807).

[Explanation of Effect]

Similar to the access token system 200 according to the second example embodiment, the access token system 1200 according to this example embodiment can prevent illegal distribution of an access token. In addition, an unlimited lifetime of the access token can be set.

On the other hand, the second example embodiment imposes the restriction that "only the generator 311 can calculate the inverse element of the value obtained by processing the secret information of the recipient". Due to this restriction, it is necessary to handle with processing like key generation in RSA encryption, and the secret information processing function is limited. Furthermore, for example, if processing like key generation in RSA encryption is performed, a value obtained by embedding, in the hash value of Policy, the inverse element of the value obtained by processing the secret information is a value on a composite order N and thus the size unwantedly becomes large. In the access token system 200, a malicious user may send, to the verifier 421, a value given by:

$$\text{Policy} \| H(\text{Policy}) \quad (23)$$

If such value is sent to the verifier 421, challenge-response unwantedly succeeds, and thus it is necessary to calculate a hash value for Policy in step S801, imposing a problem that the process branches.

The access token system 1200 according to this example embodiment solves the above problems. In the access token system 1200, there is no restriction that "only the generator 311 can calculate the inverse element of the value obtained by processing the secret information of the recipient". This is because "the designation of the recipient cannot be canceled/altered" is given as the property of the mask function. That is, essentially, the restriction that "only the generator 311 can calculate the inverse element of the value obtained by processing the secret information of the recipient" is imposed to implement "the designation of the recipient cannot be canceled/altered". This is implemented in the access token system 1200 using the mask function. Furthermore, for example, the value obtained by embedding, in the hash value of Policy, the inverse element of the value obtained by processing the secret information is a value on a prime number q, and thus the size becomes small. Since the value obtained by embedding, in the hash value of Policy, the inverse element of the value obtained by processing the secret information is masked, the above attack is not established. Thus, the process does not branch in step S1601.

Fourth Example Embodiment

Figure 17:
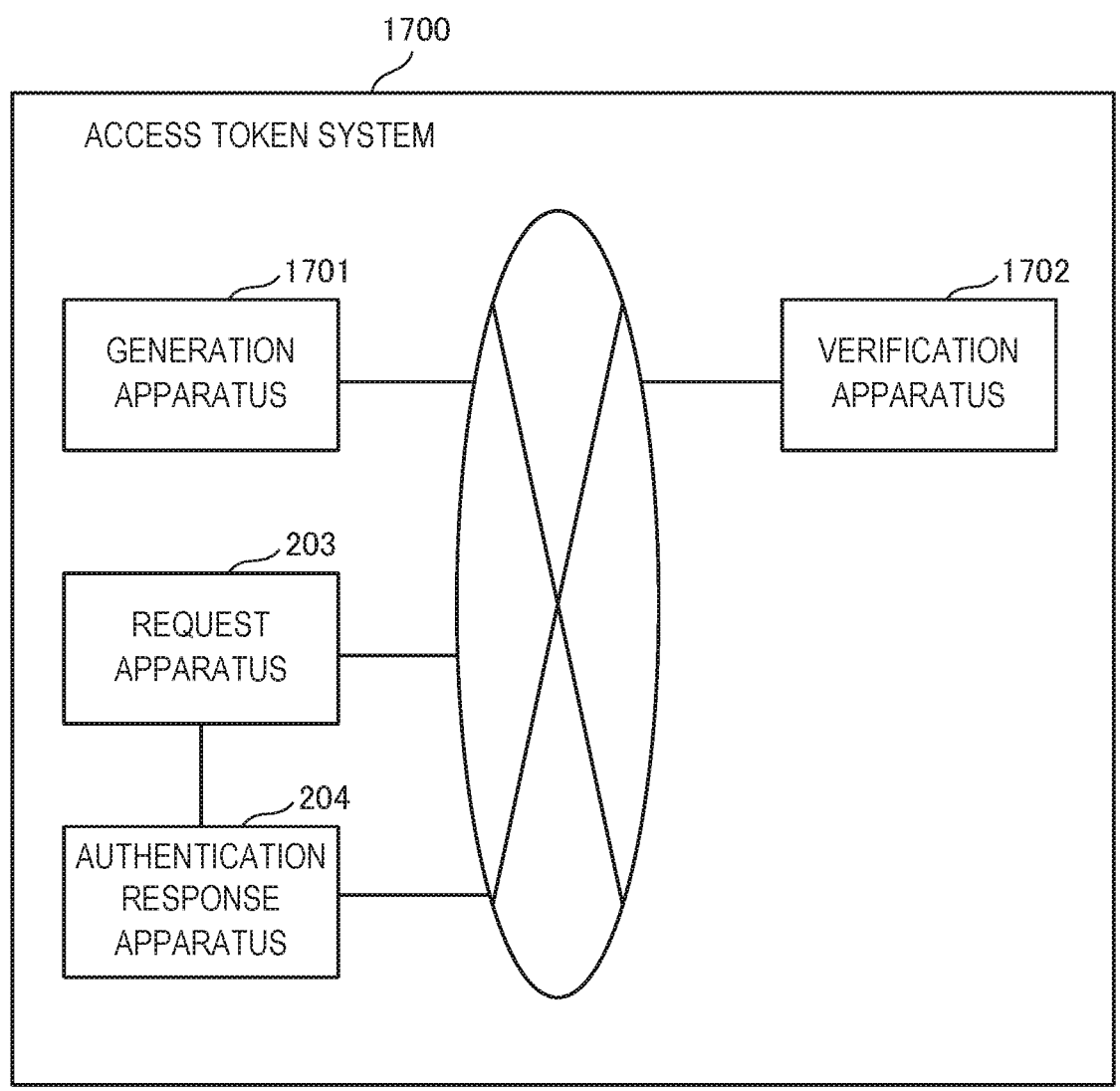
FIG. 17 is a block diagram showing the arrangement of an access token system according to the fourth example embodiment of the present invention.

An access token system according to the fourth example embodiment of the present invention will be described next with reference to FIGS. 17 to 21. FIG. 17 is a block diagram for explaining the arrangement of an access token system according to this example embodiment. The access token system according to this example embodiment is different from those in the second and third example embodiments in that each of a generation apparatus and a verification apparatus includes a time acquirer. The remaining components and operations are the same as those in the second and third example embodiments. Hence, the same reference numerals denote the same components and operations, and a detailed description thereof will be omitted.

[Explanation of Arrangement]

As shown in FIG. 17, an access token system 1700 according to this example embodiment includes a generation apparatus 1701, a verification apparatus 1702, a request apparatus 203, and an authentication response apparatus 204. The generation apparatus 1701, the verification apparatus 1702, and the request apparatus 203 are communicably connected via an external network. Furthermore, the request apparatus 203 and the authentication response apparatus 204 are communicably connected.

Figure 19:
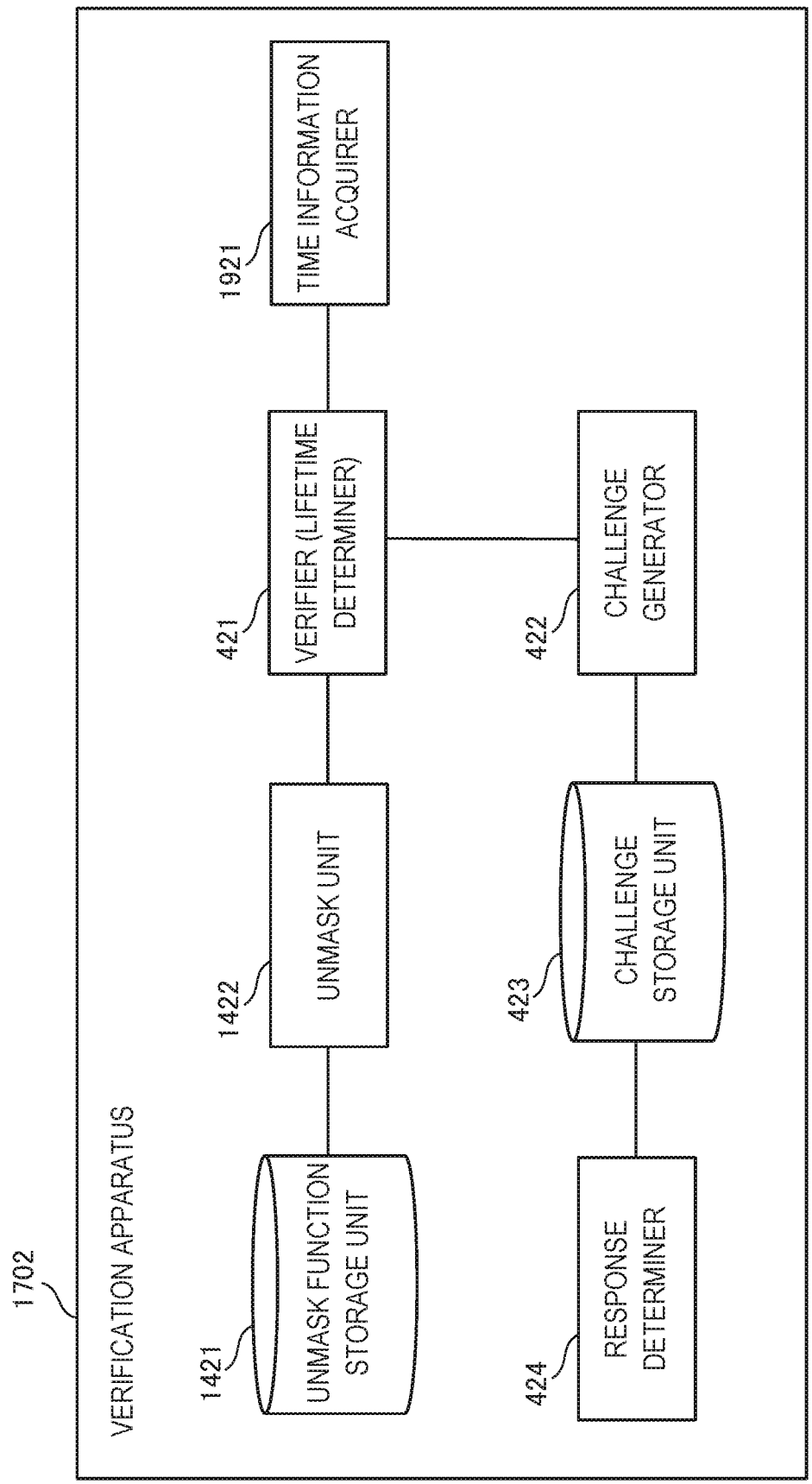
FIG. 19 is a block diagram showing the arrangement of a verification apparatus of the access token system according to the fourth example embodiment of the present invention.

FIG. 18 is a block diagram showing the arrangement of the generation apparatus 1701 of the access token system 1700 according to this example embodiment. FIG. 19 is a block diagram showing the arrangement of the verification apparatus 1702 of the access token system 1700 according to the fourth example embodiment.

The generation apparatus 1701 further includes a time information acquirer 1811. The time information acquirer 1811 is connected to a generator 311. The verification apparatus 1702 further includes a time information acquirer 1921. The time information acquirer 1921 is connected to a verifier 421.

The time information acquirer 1811 acquires time information, and outputs it to the generator 311.

The generator 311 is the same as that in the access token system 200 or 1200. However, when generating Policy, the generator 311 creates Policy so as to concatenate a lifetime using the time information input from the time information acquirer 1811. That is, the generator 311 also operates as a lifetime designator. For example, Policy is given by:

$$URL \| TTL \quad (24)$$

TTL (Time To Live) represents the lifetime.

The verifier 421 is the same as that in the access token system 200 or 1200. However, when receiving a recipient-designated access token at an input, the verifier 421 determines, using the time information input from the time information acquirer 1921, whether the lifetime included in input Policy is valid or not. That is, the verifier 421 also operates as a lifetime determiner. If the lifetime is invalid, access is rejected. If the lifetime is valid, the verifier 421 continuously operates in the same manner as that in the access token system 200 or 1200.

[Explanation of Operation]

Figure 20:
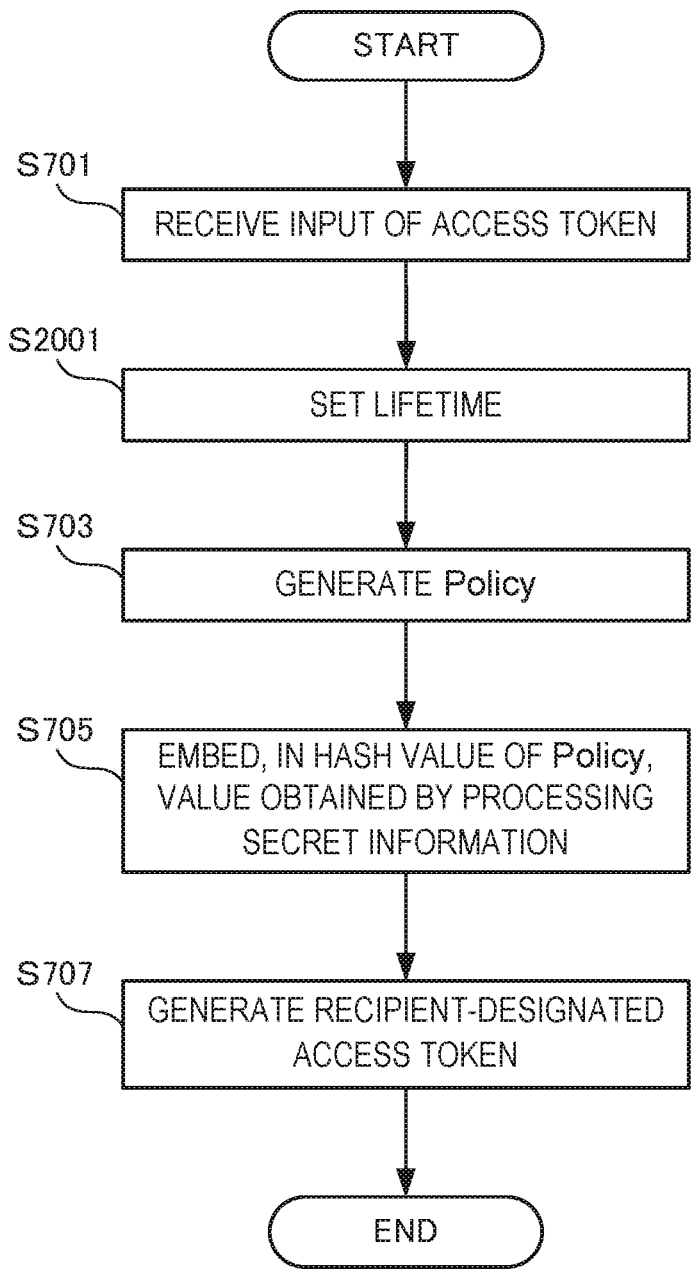
FIG. 20 is a flowchart for explaining the processing procedure of the generation apparatus of the access token system according to the fourth example embodiment of the present invention.

FIG. 20 is a flowchart for explaining the processing procedure of the generation apparatus 1701 of the access token system 1700 according to this example embodiment. Note that the same step numbers as in FIG. 7 denote the same steps and a description thereof will be omitted. The generator 311 sets a lifetime for Policy (step S2001).

FIG. 21 is a flowchart for explaining the processing procedure of the verification apparatus 1702 of the access token system 1700 according to this example embodiment. Note that the same step numbers as in FIG. 8 denote the same steps and a description thereof will be omitted. The verifier 421 performs lifetime determination of whether the lifetime is valid or nor (step S2101). Note that if it is determined in step S2101 that the lifetime is not valid, access is rejected (step S809).

[Explanation of Effect]

Similar to the access token system 200 according to the second example embodiment or the access token system 1200 according to third example embodiment, it is possible to prevent illegal distribution of an access token. However, a lifetime is set for an access token. That is, unlike the second or third example embodiment, the advantage of this example embodiment is that a lifetime can be set, similarly to the conventional access token systems.

Fifth Example Embodiment

An access token system according to the fifth example embodiment of the present invention will be described next with reference to FIGS. 22 to 26. FIG. 22 is a block diagram for explaining the arrangement of an access token system according to this example embodiment. The access token system according to this example embodiment is different from those in the second to fourth example embodiments in that a generation apparatus includes a signature key storage unit and a signature unit and a verification apparatus includes a signature verification key storage unit and a signature verifier. The remaining components and operations are the same as those in the second to fourth example embodiments. Hence, the same reference numerals denote the same components and operations, and a detailed description thereof will be omitted.

[Explanation of Arrangement]

As shown in FIG. 22, an access token system 2200 according to this example embodiment includes a generation apparatus 2201, a verification apparatus 2202, a request apparatus 203, and an authentication response apparatus 204. The generation apparatus 2201, the verification apparatus 2202, and the request apparatus 203 are communicably connected via an external network. Furthermore, the request apparatus 203 and the authentication response apparatus 204 are communicably connected.

FIG. 23 is a block diagram showing the arrangement of the generation apparatus 2201 of the access token system 2200 according to this example embodiment. The generation apparatus 2201 further includes a signature key storage unit 2311 and a digital signature unit 2312. The digital signature unit 2312 is connected to the signature key storage unit 2311 and a generator 311.

The signature key storage unit 2311 stores/holds a signature key in a digital signature method. Examples of the digital signature method are RSA signature and HMAC described non-patent literature 5. If a digital signature is generated for a recipient-designated access token, a signature key is output to the digital signature unit 2312. Note that the recipient-designated access token includes neither a function used to process secret information nor the second argument of the function.

The digital signature unit 2312 receives, at an input, the recipient-designated access token output from the generator 311 and the signature key output from the signature key storage unit 2311. Note that the recipient-designated access token includes neither the function used to process secret information nor the second argument of the function. The digital signature unit 2312 generates, for the input recipient-designated access token, a signature using the input signature key.

For example, a signature function is represented by Sig. At this time, the recipient-designated access tokens input by the generator 311 are given by:

$$\text{Policy} \| (H(\text{Policy}))^{(\varphi(b,r_1))^{-1}} \bmod N \quad (25)$$

$$\left((H(\text{Policy}))^{(\varphi(b,r_1))^{-1}+r_2} \oplus r_2 \bmod q\right) \quad (26)$$

In this case, the signatures are given by:

$$Sig.\left(H\left(\text{Policy} \| (H(\text{Policy}))^{(\varphi(b,r_1))^{-1}} \bmod N\right)\right) \quad (25)$$

$$Sig.\left(\left((H(\text{Policy}))^{(\varphi(b,r_1))^{-1}+r_2} \oplus r_2 \bmod q\right)\right) \quad (26)$$

The digital signature unit 2312 outputs the generated signatures to the generator 311.

The generator 311 is the same as that in the access token system 200 or 1200. However, when outputting the recipient-designated access token finally, the generator 311 outputs the recipient-designated access token by adding the signature output from the digital signature unit 2312.

Figure 24:
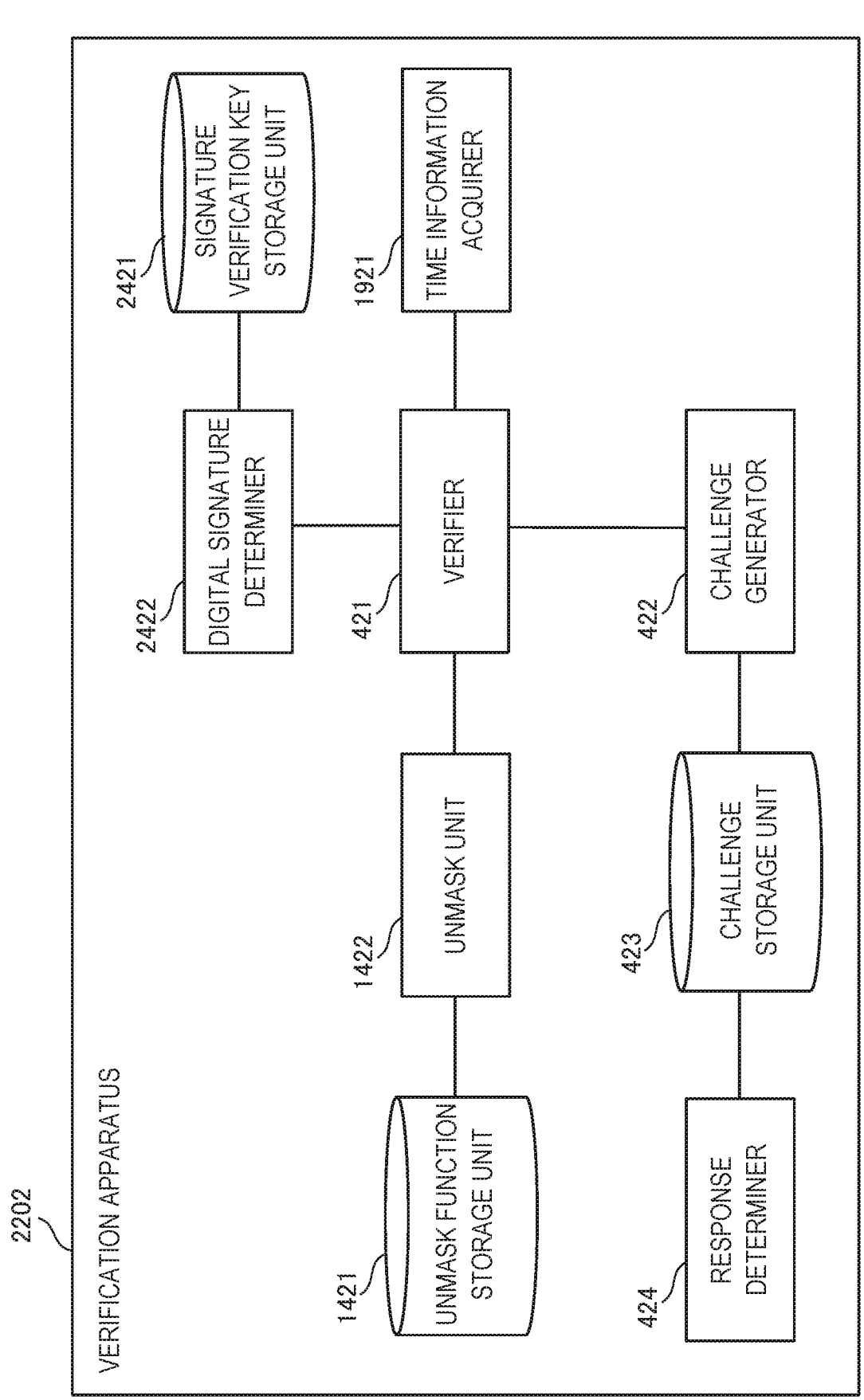
FIG. 24 is a block diagram showing the arrangement of a verification apparatus of the access token system according to the fifth example embodiment of the present invention.

FIG. 24 is a block diagram showing the arrangement of the verification apparatus 2202 of the access token system 2200 according to the fifth example embodiment. The verification apparatus 2202 further includes a signature verification key storage unit 2421 and a digital signature determiner 2422. The digital signature determiner 2422 is connected to the signature verification key storage unit 2421 and a verifier 421.

The signature verification key storage unit 2421 stores/holds a verification key in a digital signature method. Examples of the digital signature method are RSA signature and HMAC. If signature verification is performed for a recipient-designated access token including a signature, the verification key is output to the digital signature determiner 2422. Note that the recipient-designated access token includes neither the function used to process the secret information nor the second argument of the function.

The digital signature determiner 2422 receives, at an input, the recipient-designated access token added with the signature output from the verifier 421 and the verification key output from the signature verification key storage unit 2421. Note that the recipient-designated access token includes neither the function used to process the secret information nor the second argument of the function. Signature verification is performed using the input verification key for the signature added to the input recipient-designated access token. If, as a result of the verification processing, the signature is invalid, access is rejected. If the signature is valid, a determination result indicating that the signature is valid is output to the verifier 421.

[Explanation of Operation]

Figure 25:
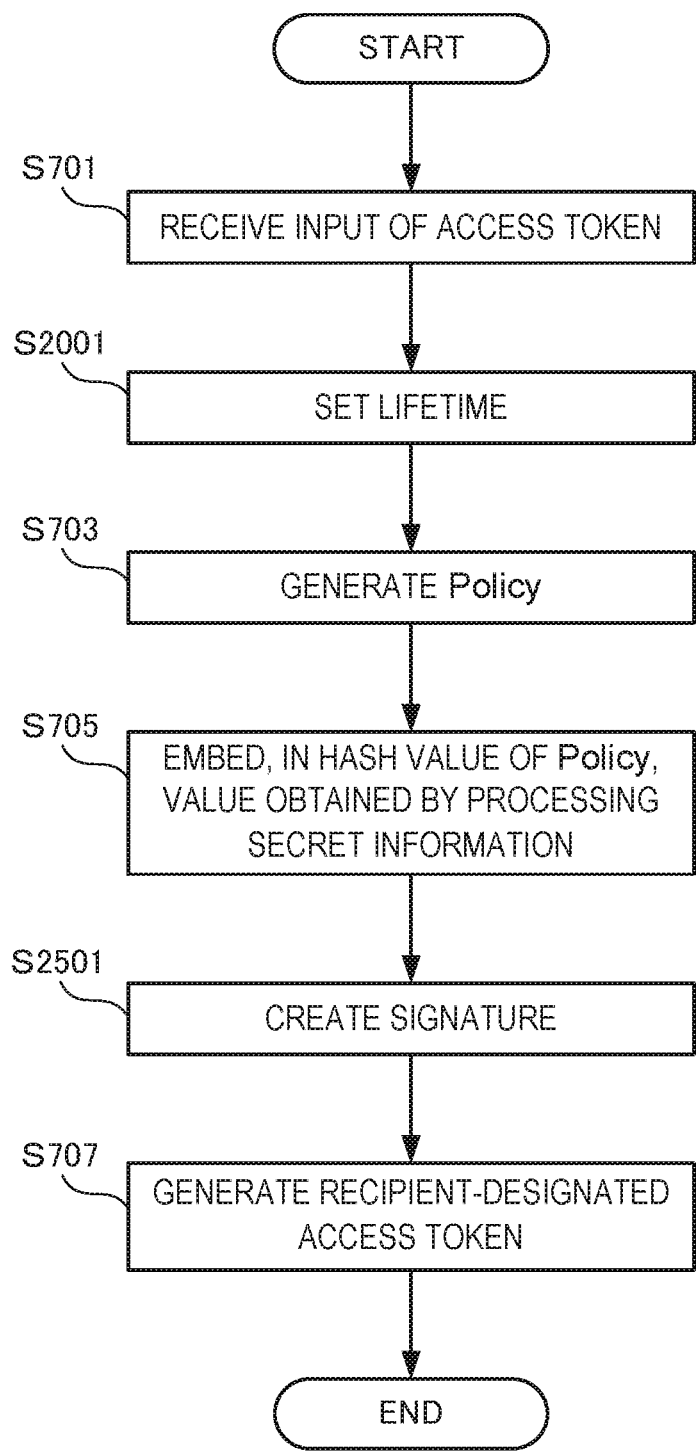
FIG. 25 is a flowchart for explaining the processing procedure of the generation apparatus of the access token system according to the fifth example embodiment of the present invention.

FIG. 25 is a flowchart for explaining the processing procedure of the generation apparatus 2201 of the access token system 2200 according to this example embodiment. Note that the same step numbers as in FIG. 20 denote the same steps and a description thereof will be omitted. The generator 311 generates a signature for the recipient-designated access token (step S2501).

Figure 26:
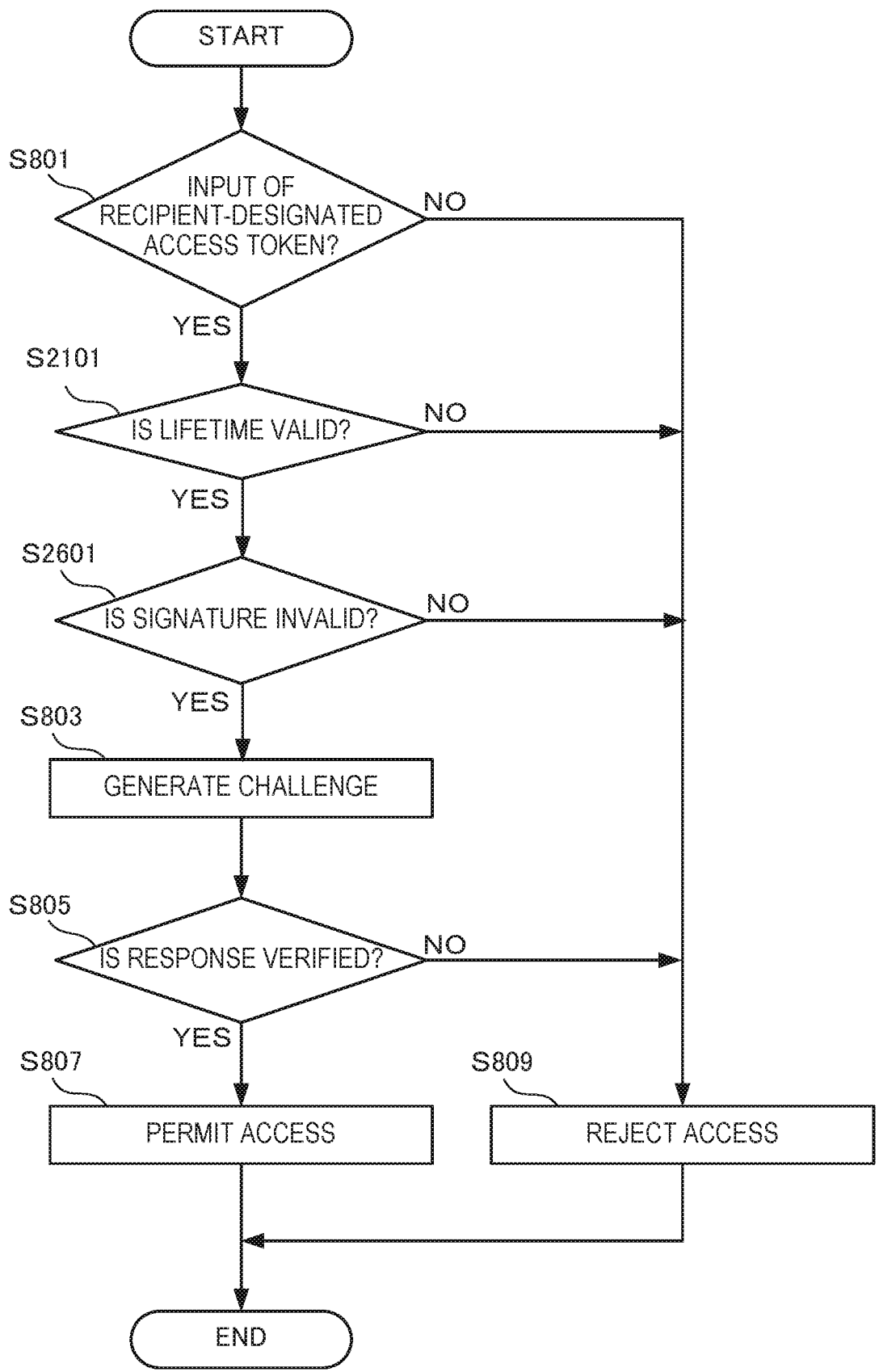
FIG. 26 is a flowchart for explaining the processing procedure of the verification apparatus of the access token system according to the fifth example embodiment of the present invention.

FIG. 26 is a flowchart for explaining the processing procedure of the verification apparatus 2202 of the access token system 2200 according to this example embodiment. Note that the same step numbers as in FIG. 21 denote the same steps and a description thereof will be omitted. The verifier 421 performs signature verification to determine whether the signature is invalid or not (step S2601). If, as a result of the verification processing, it is determined in step S2601 that the signature is invalid, access is rejected (step S809). If it is determined that the signature is valid, the operation advances to step S803.

[Explanation of Effect]

Similar to the second to fourth example embodiments, it is possible to prevent illegal distribution of an access token. If an illegal user transmits a random value which indicates that the time falls within the lifetime, in the second to fourth example embodiments, it cannot be determined whether this value is an attack by the illegal user or a legally created recipient-designated access token, before the result of challenge-response is known, that is, before step S805 ends.

On the other hand, in the access token system 2200 according to this example embodiment, it is possible to perform determination by signature verification before the operations in step S803 and the subsequent steps are executed. This is because only the user having the signature key, that is, the user having the generation apparatus 2201 including the signature key storage unit 2311 that holds the signature key can generate a signature.

Other Example Embodiments

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

The present invention is applicable to a system including a plurality of devices or a single apparatus. The present invention is also applicable even when an information processing program for implementing the functions of example embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described example embodiments.

Other Expressions of Example Embodiments

Some or all of the above-described example embodiments can also be described as in the following supplementary notes but are not limited to the followings.

(Supplementary Note 1)

There is provided an access token system comprising:

a generator that generates, using secret information of a recipient, a recipient-designated access token for which the recipient is designated, and provides the recipient-designated access token to a user; and a verifier that verifies that the user who makes access using the recipient-designated access token is the designated recipient.

(Supplementary Note 2)

There is provided the access token system according to supplementary note 1, wherein the verifier includes a challenge generator that generates a challenge in accordance with the access by the user, and transmits the challenge, and a response determiner that determines a response generated and transmitted with respect to the challenge, and verifies that the user who makes access using the recipient-designated access token is the designated recipient.

(Supplementary Note 3)

There is provided the access token system according to supplementary note 1 or 2, wherein the access token system further includes a response generator that generates a response to the transmitted challenge and transmits the response.

(Supplementary Note 4)

There is provided the access token system according to any one of supplementary notes 1 to 3, wherein the generator generates the recipient-designated access token by embedding, in a hash value of a character string generated from the access token, an inverse element of a processed value as a value obtained by processing the secret information, and further includes a mask unit that masks the hash value in which the inverse element is embedded.

(Supplementary Note 5)

There is provided the access token system according to supplementary note 4, wherein the mask unit masks the hash value by performing an XOR (Exclusive OR) operation using an inverse element portion in which the inverse element of the processed value is embedded, and a random number whose bit length is equal to a bit length of the inverse element portion.

(Supplementary Note 6)

There is provided the access token system according to any one of supplementary notes 1 to 5, wherein the generator generates the recipient-designated access token using a round robin difficulty value obtained by processing the secret information of the recipient into a value that is difficult to perform round robin.

(Supplementary Note 7)

There is provided the access token system according to any one of supplementary notes 1 to 6, further comprising:

a lifetime designator that designates a lifetime for the recipient-designated access token; and a lifetime determiner that determines whether a lifetime of the recipient-designated access token for which the lifetime is designated falls within the lifetime.

(Supplementary Note 8)

There is provided the access token system according to any one of supplementary notes 1 to 7, further comprising:

a digital signature generator that generates a digital signature for the recipient-designated access token, and adds the digital signature; and a digital signature determiner that determines whether the digital signal is valid.

(Supplementary Note 9)

There is provided an information processing apparatus comprising:

a generator that generates, using secret information of a recipient, a recipient-designated access token for which the recipient is designated, and provides the recipient-designated access token to a user.

(Supplementary Note 10)

There is provided an information processing method comprising:

generating, using secret information of a recipient, a recipient-designated access token for which the recipient is designated, and providing the recipient-designated access token to a user.

(Supplementary Note 11)

There is provided an information processing program for causing a computer to execute a method, comprising:

generating, using secret information of a recipient, a recipient-designated access token for which the recipient is designated, and providing the recipient-designated access token to a user.

What is claimed is:

1. An access token system comprising:
a generator that comprises,
one or more first memories configured to store first instructions, and
one or more first processors configured to execute the first instructions to:
generate a first hash value based on a first access token;
calculate an inverse element of a processed value, wherein the processed value is obtained by processing a random number and a secret information of a recipient using a processing function;
generate a recipient-designated access token which includes a recipient-designated hash value, wherein the recipient-designated access token is generated by embedding the calculated inverse element of the processed value into the generated first hash value; and
provide the recipient-designated access token to a user; and
a verifier that comprises,
one or more second memories configured to store second instructions, and
one or more second processors configured to execute the second instructions to:
receive, from the user of an input device, an input indicating the recipient-designated access token; and
authenticate the recipient-designated hash value included in the recipient-designated access token; and
in response to authenticating the recipient-designated hash value included in the recipient-designated access token, verify that the user who makes the input indicating the recipient-designated access token is a designated recipient to access a target resource.

2. The access token system according to claim 1, wherein the one or more second processors are further configured to execute the second instructions to:
generate a challenge in accordance with the recipient-designated access token received from the user, and transmit the challenge to a response generator, and
determine a response generated with respect to the challenge in the response generator and returned from the response generator to verify that the user who makes access using the recipient-designated access token is the designated recipient.

3. The access token system according to claim 2, wherein the response generator comprises,
one or more third memories configured to store third instructions, and
one or more third processors configured to execute the third instructions to:
generate the response to the challenge received from the verifier; and
transmit the response to the verifier.

4. The access token system according to claim 1, wherein,
the one or more first processors are further configured to execute the first instructions to mask the recipient-designated hash value, and
the one or more second processors are further configured to execute the second instructions to unmask the masked recipient-designated hash value.

5. The access token system according to claim 4, wherein the one or more first processors are configured to execute the first instructions to mask the recipient-designated hash value by performing an XOR (Exclusive OR) operation using an inverse element portion in which the inverse element of the processed value is embedded, and a random number whose bit length is equal to a bit length of the inverse element portion.

6. The access token system according to claim 1, wherein the one or more first processors are further configured to execute the first instructions to generate the recipient-designated access token using a round robin difficulty value obtained by processing the secret information of the recipient into a value that is difficult to perform round robin.

7. The access token system according to claim 1, wherein, the one or more first processors are further configured to execute the first instructions to designate a lifetime for the recipient-designated access token, and
the one or more second processors are further configured to execute the second instructions to determine whether a lifetime of the recipient-designated access token for which the lifetime is designated falls within the lifetime.

8. The access token system according to claim 1, wherein, the one or more first processors are further configured to execute the first instructions to generate a digital signature for the recipient-designated access token, and add the digital signature, and the one or more second processors are further configured to execute the second instructions to determine whether a digital signature for the recipient-designated access token is valid.

9. The access token system according to claim 1, wherein the one or more second processors are further configured to execute the second instructions to:
determine whether an access token data received from the user corresponds to the recipient-designated access token,
verify that the user is the designated recipient, if the received access token data corresponds to the recipient-designated access token, and
reject the received access token data, if the received access token data does not correspond to the recipient-designated access token.

10. The access token system according to claim 9, wherein the one or more second processors are configured to execute the second instructions to:
determine, if a second hash value obtained by performing hash operation on a second access token included in the received access token data is different from a third hash value included in the received access token data, that the received access token data corresponds to the recipient-designated access token, and
determine, if the second hash value is equal to the third hash value, that the received access token data does not correspond to the recipient-designated access token.

11. The access token system according to claim 3, wherein,
the one or more second processors are configured to execute the second instructions to generate the challenge based on the recipient-designated hash value,
the one or more third processors are configured to execute the third instructions to generate the response including a fourth hash value in which the inverse element is not embedded by using an element of the processed value, and
the one or more second processors are configured to execute the second instructions to:
determine whether the fourth hash value included in the response is equal to a third hash value obtained by performing hash operation on a third access token included in received access token data, and
verify, if the fourth hash value is equal to the third hash value, that the user is the designated recipient.

12. An information processing apparatus comprising:
one or more memories configured to store instructions; and
one or more processors configured to execute the instructions to:
generate a first hash value based on a first access token;
calculate an inverse element of a processed value, wherein the processed value is obtained by processing a random number and a secret information of a recipient using a processing function;
generate a recipient-designated access token which includes a recipient-designated hash value, wherein the recipient-designated access token is generated by embedding the calculated inverse element of the processed value into the generated first hash value; and
provide the recipient-designated access token to a first user for access to a target resource.

13. An information processing apparatus comprising:
one or more memories configured to store instructions; and
one or more processors configured to execute the instructions to:
receive an input indicating a recipient-designated access token including a recipient-designated hash value from an user, wherein the recipient-designated access token is being generated by:
generating a first hash value based on a first access token;
calculating an inverse element of a processed value, wherein the processed value is obtained by processing a random number and a secret information of a recipient using a processing function; and
embedding the calculated inverse element of the processed value into the generated first hash value;
authenticate the recipient-designated hash value included in the recipient-designated access token; and
in response to authenticating the recipient-designated hash value included in the recipient-designated access token, verify that the user who inputs the recipient-designated access token is a designated recipient to access a target resource.

14. The information processing apparatus according to claim 13, wherein the one or more processors are further configured to execute the instructions to:
generate a challenge in accordance with the recipient-designated access token received from the user, and transmit the challenge to a response generator, and
determine a response generated with respect to the challenge in the response generator and returned from the response generator to verify that the user who makes access using the recipient-designated access token is the designated recipient.

15. The information processing apparatus according to claim 13, wherein the one or more processors are further configured to execute the instructions to:
determine whether an access token data received from the user corresponds to the recipient-designated access token,
verify that the user is the designated recipient using the recipient-designated access token, if the received access token data corresponds to the recipient-designated access token, and
reject the received access token data, if the received access token data does not correspond to the recipient-designated access token.

* * * * *